US010887932B2

(12) United States Patent
Koo et al.

(10) Patent No.: US 10,887,932 B2
(45) Date of Patent: *Jan. 5, 2021

(54) ELECTRONIC DEVICE AND METHOD OF REGISTERING PERSONAL CLOUD APPARATUS IN USER PORTAL SERVER THEREOF

(71) Applicant: Samsung Electronics Co., Ltd., Suwon-si (KR)

(72) Inventors: Bon-hyun Koo, Suwon-si (KR); Kyoung-lae Noh, Hwaseong-si (KR); Su-byeong Oh, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 458 days.

This patent is subject to a terminal disclaimer.

(21) Appl. No.: 14/255,378

(22) Filed: Apr. 17, 2014

(65) Prior Publication Data
US 2014/0317242 A1 Oct. 23, 2014

(30) Foreign Application Priority Data
Apr. 23, 2013 (KR) ........................ 10-2013-0045077

(51) Int. Cl.
*H04W 76/14* (2018.01)
*H04W 4/80* (2018.01)
(Continued)

(52) U.S. Cl.
CPC ......... *H04W 76/14* (2018.02); *H04L 67/1097* (2013.01); *H04W 4/80* (2018.02);
(Continued)

(58) Field of Classification Search
CPC ..... H04W 4/008; H04W 76/023; H04W 4/80; H04W 92/10; H04W 76/10; H04W 76/14;
(Continued)

(56) References Cited

U.S. PATENT DOCUMENTS 7,948,925 B2  5/2011  Miyabayashi et al.
8,464,953 B2 * 6/2013  Zsigmond ............... H04L 67/34
235/454
(Continued)

FOREIGN PATENT DOCUMENTS

CN  101356763 A  1/2009
CN  101534505 A  9/2009
(Continued)

OTHER PUBLICATIONS

Merriam-Webster, "Definition of acquire", https://www.merriam-webster.com/dictionary/acquire (Year: 2020).*
(Continued)

*Primary Examiner* — Gregory G Todd
(74) *Attorney, Agent, or Firm* — Jefferson IP Law, LLP

(57) ABSTRACT

An electronic device and a method of registering a personal cloud apparatus in a user portal server thereof are provided. The method includes receiving download information of a preset application and pairing information of the personal cloud apparatus from the personal cloud apparatus via Near Field Communication (NFC), downloading and executing the preset application based on the download information of the preset application, when the preset application is executed, performing a pairing operation with the personal cloud apparatus based on the pairing information of the personal cloud apparatus, acquiring information of an Access Point (AP) and transmitting the information of the AP to the personal cloud apparatus to connect the personal cloud apparatus to a network, and, when the personal cloud apparatus is connected to the network through the AP, registering the personal cloud apparatus in the registration server.

27 Claims, 24 Drawing Sheets

(51) Int. Cl.
*H04L 29/08* (2006.01)
*H04W 12/00* (2009.01)
*H04W 92/10* (2009.01)
*H04W 12/04* (2009.01)
*H04W 76/10* (2018.01)

(52) U.S. Cl.
CPC ... *H04W 12/003* (2019.01); *H04W 12/00407* (2019.01); *H04W 12/04071* (2019.01); *H04W 92/10* (2013.01); *H04W 76/10* (2018.02)

(58) Field of Classification Search
CPC ............... H04W 76/15; H04W 12/003; H04W 12/04071; H04W 12/00407; H04L 41/0806; H04L 41/0846; H04L 67/1097
See application file for complete search history.

(56) References Cited

U.S. PATENT DOCUMENTS

| | | | |
|---|---|---|---|
| 8,560,012 B2 | 10/2013 | Ohnishi | |
| 8,565,131 B2 | 10/2013 | Miyabayashi et al. | |
| 8,627,075 B2* | 1/2014 | Ikeda | H04B 5/02 455/41.1 |
| 8,749,823 B2 | 6/2014 | Kato | |
| 8,773,698 B2 | 7/2014 | Oshima et al. | |
| 8,811,613 B2 | 8/2014 | Teruyama | |
| 9,037,683 B1* | 5/2015 | Yoden | H04L 65/60 709/219 |
| 9,301,084 B2* | 3/2016 | Kim | H04L 41/0846 |
| 9,325,673 B2 | 4/2016 | Teruyama | |
| 9,814,084 B2* | 11/2017 | Sidhu | H04W 76/10 |
| 9,973,479 B2 | 5/2018 | Teruyama | |
| 2008/0247545 A1* | 10/2008 | Teruyama | H04L 9/0841 380/255 |
| 2009/0227282 A1 | 9/2009 | Miyabayashi et al. | |
| 2011/0167469 A1 | 7/2011 | Letca et al. | |
| 2011/0205994 A1 | 8/2011 | Miyabayashi et al. | |
| 2011/0292445 A1 | 12/2011 | Kato | |
| 2011/0304583 A1* | 12/2011 | Kruglick | G06F 3/044 345/174 |
| 2012/0019674 A1 | 1/2012 | Ohnishi | |
| 2012/0057193 A1* | 3/2012 | Jazayeri | G06F 3/1204 358/1.15 |
| 2012/0066670 A1 | 3/2012 | McCarthy et al. | |
| 2012/0194863 A1 | 8/2012 | Oshima et al. | |
| 2013/0005250 A1* | 1/2013 | Kim | H04N 21/4126 455/41.1 |
| 2013/0027741 A1* | 1/2013 | Liu | G06F 3/1204 358/1.15 |
| 2013/0046982 A1 | 2/2013 | Suh et al. | |
| 2013/0070926 A1 | 3/2013 | Eun | |
| 2013/0091502 A1 | 4/2013 | Kang et al. | |
| 2013/0215467 A1* | 8/2013 | Fein | G06F 3/1204 358/1.15 |
| 2013/0217359 A1* | 8/2013 | Cherian | G06F 15/177 455/411 |
| 2013/0223278 A1* | 8/2013 | Inada | H04L 41/0816 370/254 |
| 2013/0260682 A1* | 10/2013 | Suzuki | H04W 88/06 455/41.1 |
| 2014/0036296 A1* | 2/2014 | Armstrong | G06F 3/1208 358/1.14 |
| 2014/0189043 A1* | 7/2014 | Yang | H04L 67/1097 709/214 |
| 2014/0317242 A1* | 10/2014 | Koo | H04W 4/001 709/219 |
| 2014/0320921 A1 | 10/2014 | Oshima et al. | |
| 2014/0337625 A1 | 11/2014 | Teruyama | |
| 2014/0368865 A1* | 12/2014 | Gutnik | G06F 3/1222 358/1.15 |
| 2014/0375428 A1* | 12/2014 | Park | G06K 7/10237 340/10.1 |
| 2015/0199161 A1* | 7/2015 | Gutnik | G06F 3/1296 358/1.15 |
| 2015/0286715 A1* | 10/2015 | Barraclough | G06F 15/16 707/769 |
| 2016/0197892 A1 | 7/2016 | Teruyama | |

FOREIGN PATENT DOCUMENTS

| | | |
|---|---|---|
| CN | 102301738 A | 12/2011 |
| CN | 102356627 A | 2/2012 |
| CN | 102616022 A | 8/2012 |
| CN | 102769482 A | 11/2012 |
| KR | 10-2013-0019260 A | 2/2013 |
| KR | 10-2013-0036838 A | 4/2013 |
| KR | 10-2013-0039213 A | 4/2013 |
| WO | 2011/130449 A2 | 10/2011 |

OTHER PUBLICATIONS

Toshiba: "Register My Product > Contact Toshiba Support > Virtual Help Desk > Product Registration | Toshiba," Mar. 28, 2013, retrieved from https://web.archive.org/web/2013032807 on Oct. 4, 2018, XP 055512551.
European Search Report dated Oct. 11, 2018, issued in European Patent Application No. 18190966.4.
Korean Office Action dated Feb. 1, 2019, issued in Korean Patent Application No. 10-2013-0045077.
European Search Report dated Jan. 30, 2020; European Appln. No. 19214804.7-1213.
Indian Office Action dated Aug. 19, 2020; Indian Appln. No. 3103/MUMNP/2015.

* cited by examiner

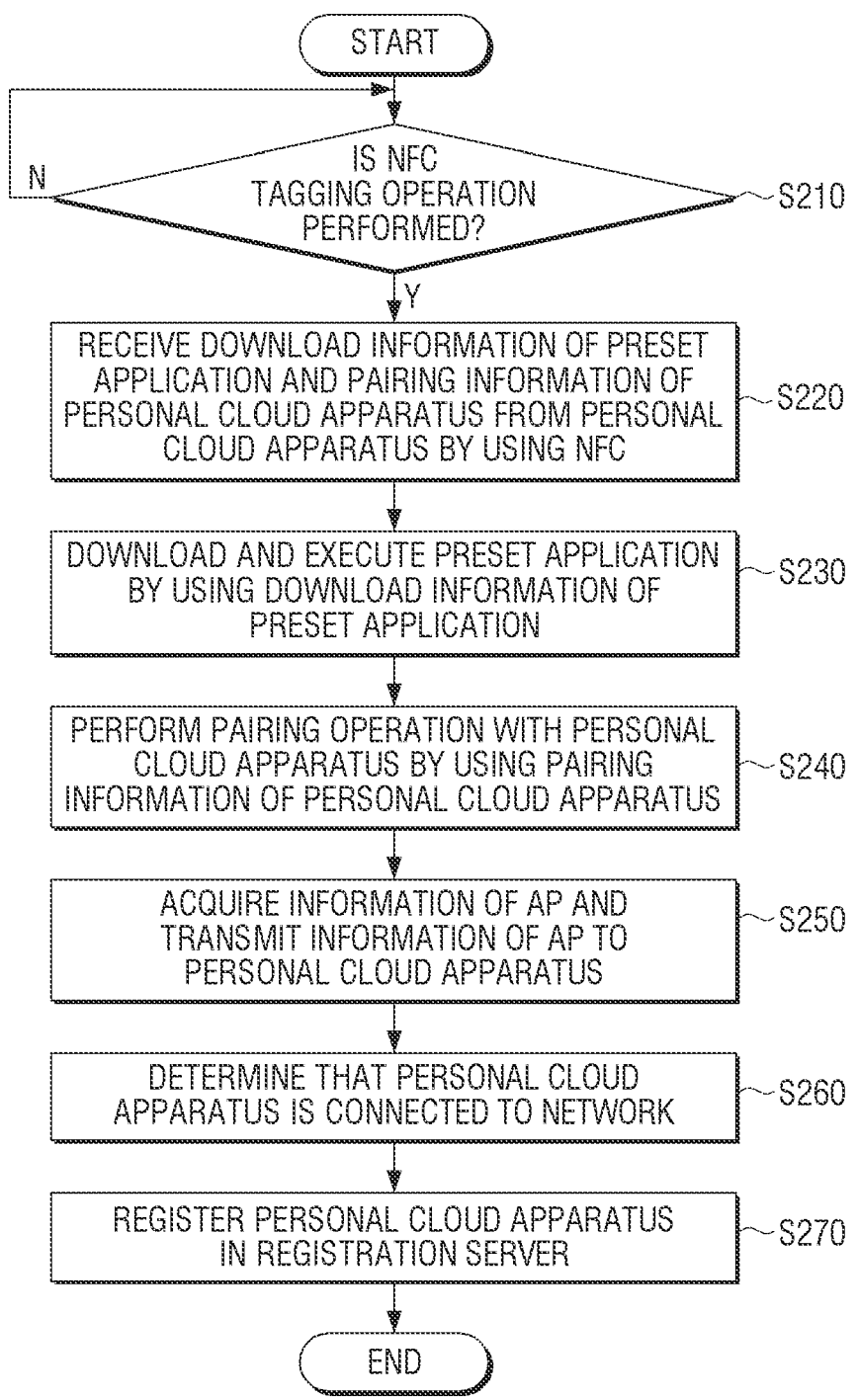

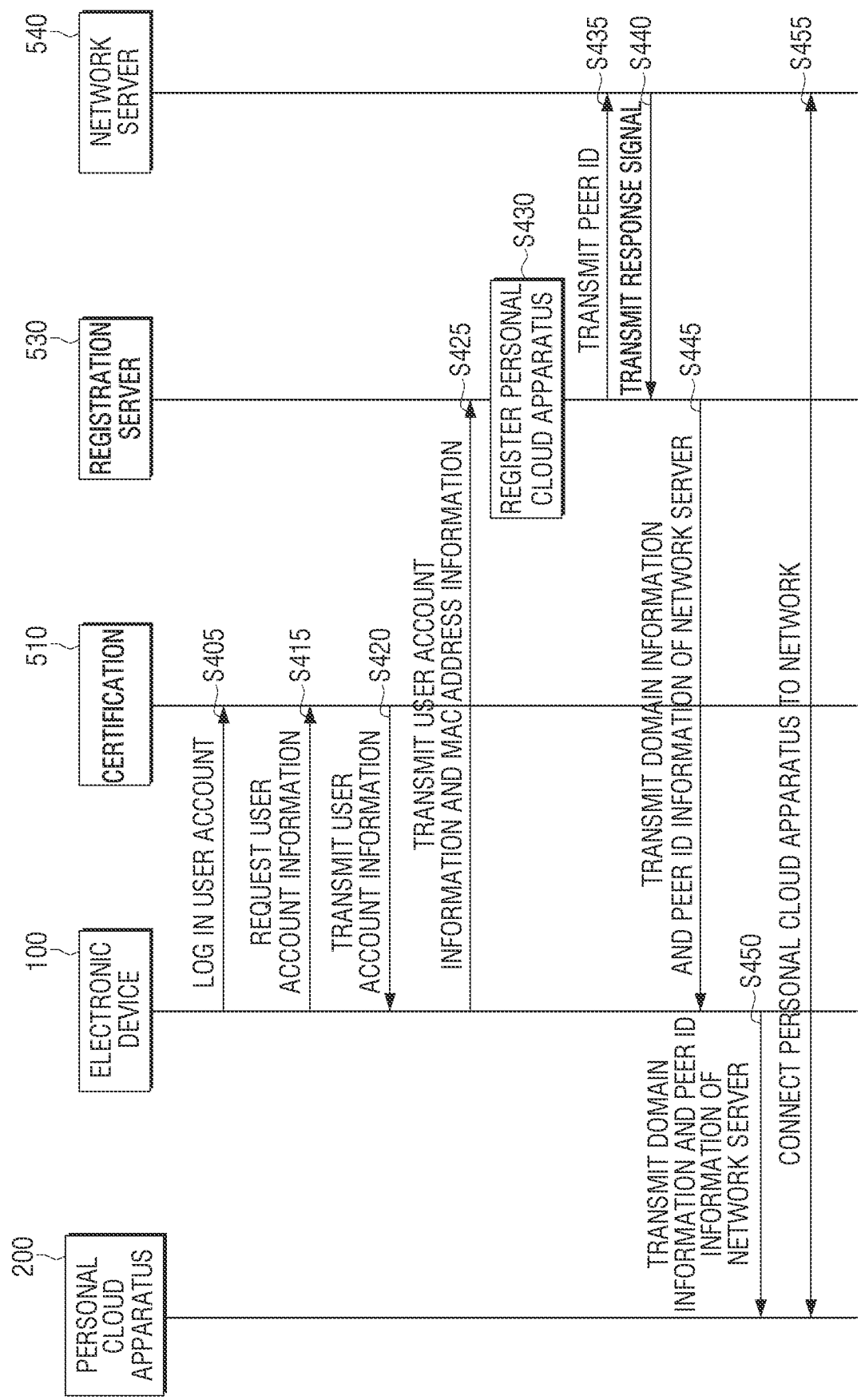

FIG. 6

| USER ACCOUNT "A" | USER ACCOUNT "B" |
|---|---|
| `<Header>`<br>x-osp-appId: gya5fuofe0<br>x-osp-userId: acklqczh5b<br>oauth_consumer_key=gya5fuofe0,<br>oauth_token=A11YJsnRc1<br>oauth_timestamp=1334040253,<br>oauth_nonce=d2317afc25434a27ba5f50b0ffcaa2a5,<br>oauth_version=1.0,<br>oauth_signature=o1TPpWnmK8ZIsJNL39Ktlhsa8HY=<br><br>`<pcwDevice>`<br>`<userID>`acklqczh5b`</userID>`<br>`<deviceID>` `</deviceID>`<br>`<deviceTypeCode>`PHONE DEVICE<br>`</deviceTypeCode>`<br>`<deviceModelID>`GT-I9100`</deviceModelID>`<br>`<deviceUniqueID>` `</deviceUniqueID>`<br>`<devicePhysicalAddressText>`MAC:00000000001<br>`</devicePhysicalAddressText>`<br>`<phoneNumberText>` `</phoneNumberText>`<br>`<mobileCountryCode>` `</mobileCountryCode>`<br>`<mobileNetworkcode>` `</mobileNetworkcode>`<br>`<customCode>` `</customCode>`<br>`<softwareVersion>` `</softwareVersion>`<br>`<service>`DEVAPP`</service>`<br>`</pcwDevice>` | `<Header>`<br>x-osp-appId: gya5fuofe0<br>x-osp-userId: gulnoevz0p<br>oauth_consumer_key=gya5fuofe0,<br>oauth_token=B13DBopCb1<br>oauth_timestamp=1334040253,<br>oauth_nonce=d2317afc25434a27ba5f50b0ffcaa2a5,<br>oauth_version=1.0,<br>oauth_signature=o1TPpWnmK8ZIsJNL39Ktlhsa8HY=<br><br>`<pcwDevice>`<br>`<userID>`gulnoevz0p`</userID>`<br>`<deviceID>` `</deviceID>`<br>`<deviceTypeCode>`PHONE DEVICE<br>`</deviceTypeCode>`<br>`<deviceModelID>`GT-I9100`</deviceModelID>`<br>`<deviceUniqueID>` `</deviceUniqueID>`<br>`<devicePhysicalAddressText>`MAC:00000000001<br>`</devicePhysicalAddressText>`<br>`<phoneNumberText>` `</phoneNumberText>`<br>`<mobileCountryCode>` `</mobileCountryCode>`<br>`<mobileNetworkcode>` `</mobileNetworkcode>`<br>`<customCode>` `</customCode>`<br>`<softwareVersion>` `</softwareVersion>`<br>`<service>`DEVAPP`</service>`<br>`</pcwDevice>` |

FIG. 14A
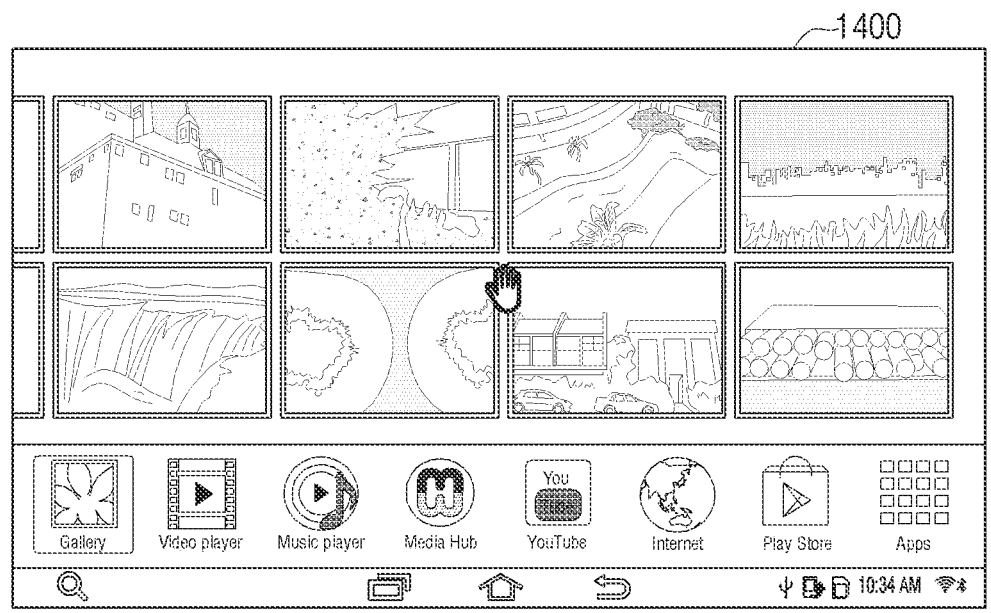
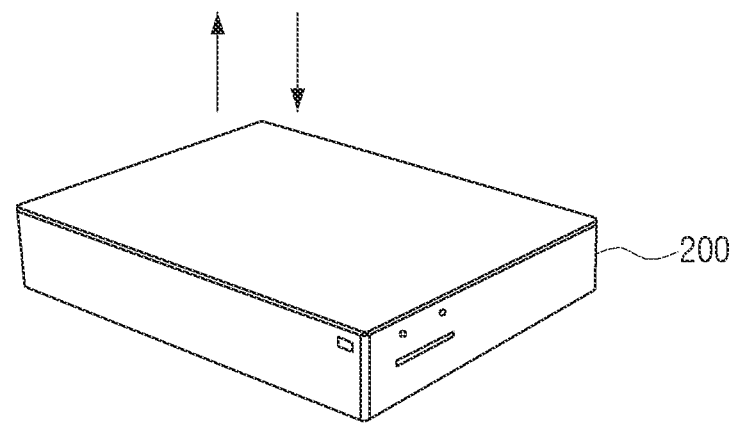
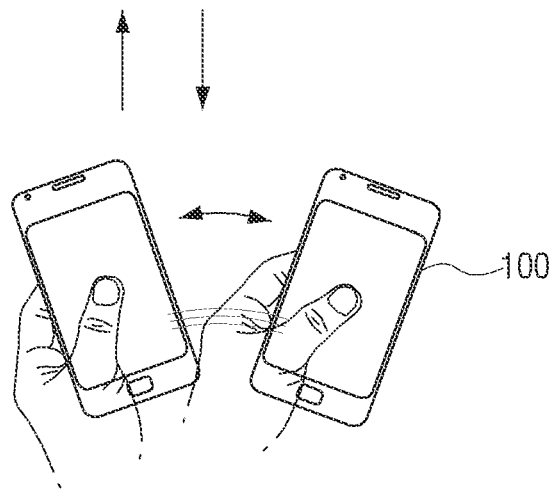

FIG. 14C
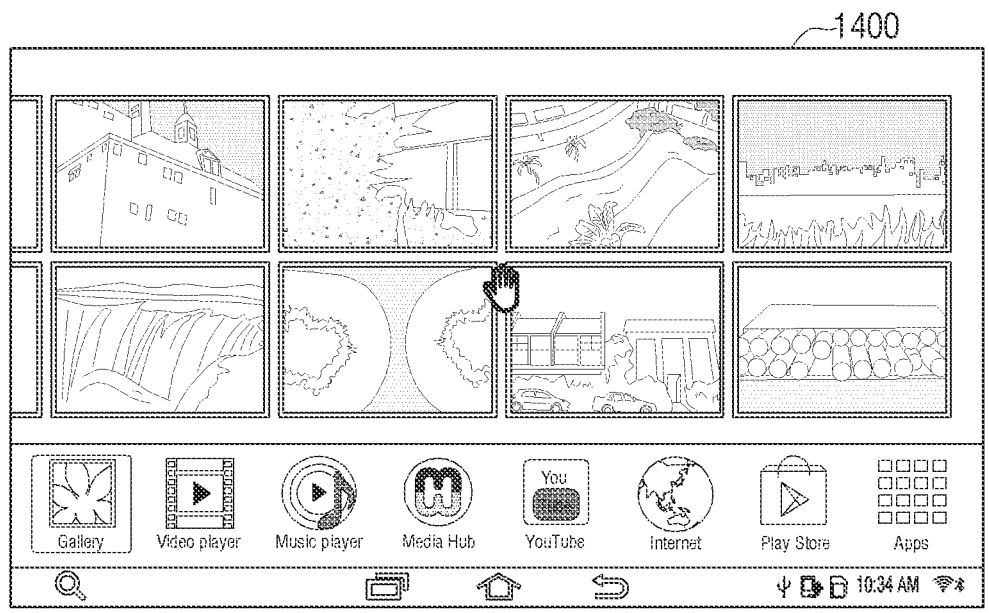
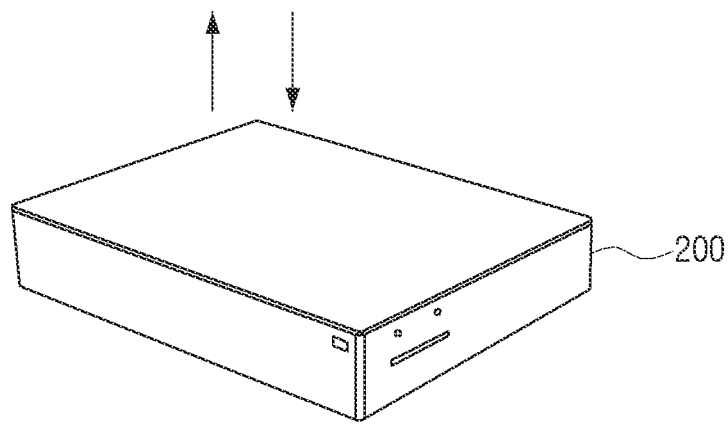
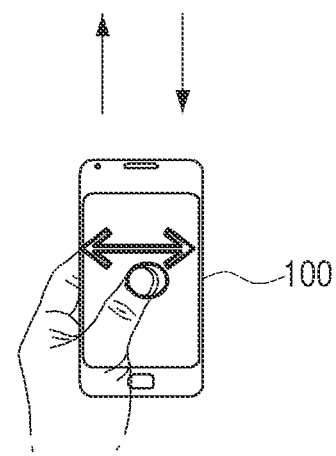

ELECTRONIC DEVICE AND METHOD OF REGISTERING PERSONAL CLOUD APPARATUS IN USER PORTAL SERVER THEREOF

CROSS-REFERENCE TO RELATED APPLICATION(S)

This application claims the benefit under 35 U.S.C. § 119(a) of a Korean patent application filed on Apr. 23, 2013 in the Korean Intellectual Property Office and assigned Serial number 10-2013-0045077, the entire disclosure of which is hereby incorporated by reference.

TECHNICAL FIELD

The present disclosure relates to providing an electronic device and a method of registering a personal cloud apparatus in a user portal server thereof. More particularly, the present disclosure relates to providing an electronic device that accesses a personal cloud apparatus through a home network or an external network to store and share content, and a method of registering the personal cloud apparatus in a user portal server thereof.

BACKGROUND

As an amount of content increases, and communication technologies are developed, a cloud server has been provided to store various types of content in a server and download content from the server any time anywhere by using an electronic device such as a smartphone or the like.

Existing public cloud services typically include a structure in which a server having a fixed infrastructure. A client (for example, an electronic device) accesses the server through a fixed Internet identifier (for example, an IP address or domain). An existing Network Attached Storage (NAS) system is a network share storage system that uploads or downloads and shares content by using an electronic device inside or outside.

In order to use an existing cloud service as described above, an initial setting process of directly setting account information by a user is accompanied. The user performs initial setting to use the existing cloud service. In the existing cloud services, the cloud server is shared by multiple users, and thus a privacy problem occurs.

A plurality of electronic devices (for example, a smartphone, a smart TV, a tablet PC, etc.) are used in a home, and family members share content. Accordingly, there is a need to develop a personal cloud apparatus that may be used by an individual or may be commonly used by family members.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an electronic device that minimizes a user input and registers a personal cloud apparatus in an external registration server by using a Near Field Communication (NFC), and a method of registering the personal cloud apparatus.

In accordance with an aspect of the present disclosure, a method of registering a personal cloud apparatus in a registration server by using an electronic device is provided. The method includes receiving download information of a preset application and pairing information of the personal cloud apparatus from the personal cloud apparatus via NFC, downloading and executing the preset application based on the download information of the preset application, when the preset application is executed, performing a pairing operation with the personal cloud apparatus based on the pairing information of the personal cloud apparatus, acquiring information of an Access Point (AP) and transmitting the information of the AP to the personal cloud apparatus to connect the personal cloud apparatus to a network, and, when the personal cloud apparatus is connected to the network through the AP, registering the personal cloud apparatus in the registration server.

According to another aspect of the present disclosure, when the electronic device has a function of automatically transmitting the information of the AP to the personal cloud apparatus, and a signal generated by a command to select a preset button of the personal cloud apparatus is received from the personal cloud apparatus, the information of the AP may be transmitted to the personal cloud apparatus without a user input.

According to another aspect of the present disclosure, when the electronic device has the function of automatically transmitting the information of the AP to the personal cloud apparatus, the transmitting of the information of the AP may include receiving a generated random value as a session key from the personal cloud apparatus, acquiring the encoded information of the AP by using the received session key, and transmitting the encoded information of the AP to the personal cloud apparatus, wherein the personal cloud apparatus decodes the encoded information of the AP based on the session key and accesses the AP by using the decoded information of the AP.

According to another aspect of the present disclosure, when the electronic device does not have a function of automatically transmitting the information of the AP to the personal cloud apparatus, the transmitting of the information of the AP may include displaying a password input User Interface (UI) for inputting a password of the AP, and when the password of the AP is input into the password input UI, transmitting the information of the AP to the personal cloud apparatus.

According to another aspect of the present disclosure, the download information of the preset application may include a name, a version, and download Uniform Resource Locator (URL) information, and the pairing information of the personal cloud apparatus may include Media Access Control (MAC) address information of the personal cloud apparatus.

According to another aspect of the present disclosure, the registering of the personal cloud apparatus in the registration server may include when a user account is logged in a certification server, receiving user account information from the certification server, transmitting the user account information and the MAC address information of the personal cloud apparatus to the registration server to register the personal cloud apparatus, when the personal cloud apparatus is registered in the registration server based on the user account information and the MAC address information, receiving domain information and peer Identification (ID) information of a network server that the personal cloud apparatus accesses, from the registration server, and transmitting the domain information and the peer ID information to the personal cloud apparatus.

According to another aspect of the present disclosure, the personal cloud apparatus may be connected to an external network through the network server by using the domain information and the peer ID information.

In accordance with another aspect of the present disclosure, an electronic device is provided. The electronic device includes an NFC communicator configured to receive download information of a preset application and pairing information of a personal cloud apparatus from the personal cloud apparatus, a communicator configured to communicate with the personal cloud apparatus and an external server, a display unit, and a controller configured to download and execute the preset application by using the download information of the preset application received through the NFC communicator, to, when the preset application is executed, perform a pairing operation with the personal cloud apparatus based on the pairing information of the personal cloud apparatus, to control the communicator to acquire information of an AP and transmit the information of the AP to the personal cloud apparatus in order to connect the personal cloud apparatus to a network, and to, when the personal cloud apparatus is connected to the network through the AP, register the personal cloud apparatus in a registration server.

According to another aspect of the present disclosure, when the electronic device has a function of automatically transmitting the information of the AP to the personal cloud apparatus, and a signal generated by a command to select a preset button of the personal cloud apparatus is received from the personal cloud apparatus, the controller may control the communicator to transmit the information of the AP to the personal cloud apparatus.

According to another aspect of the present disclosure, when the electronic device has the function of automatically transmitting the information of the AP to the personal cloud apparatus, the controller may control the communicator to receive a generated random value as a session key from the personal cloud apparatus, acquire the encoded information of the AP by using the received session key, and transmit the encoded information of the AP to the personal cloud apparatus, wherein the personal cloud apparatus decodes the encoded information of the AP based on the session key and accesses the AP by using the decoded information of the AP.

According to another aspect of the present disclosure, when the electronic device has the function of automatically transmitting the information of the AP to the personal cloud apparatus, the controller may control the display unit to display a password input UI for inputting a password of the AP and, when the password of the AP is input into the password input UI, control the communicator to transmit the information of the AP to the personal cloud apparatus.

According to another aspect of the present disclosure, the controller may control the communicator to receive user account information from a certification server when a user account is logged in the certification server, to transmit the user account information and the MAC address information of the personal cloud apparatus to the registration server to register the personal cloud apparatus, to, when the personal cloud apparatus is registered in the registration server based on the user account information and the MAC address information, receive domain information and peer ID information of a network server accessed by the personal cloud apparatus from the registration server, and to transmit the domain information and the peer ID information to the personal cloud apparatus.

In accordance with another aspect of the present disclosure, a method of registering a personal cloud apparatus in a registration server by using an electronic device is provided. The method includes when a preset application is executed, displaying a notification UI notifying that NFC is performed with the personal cloud apparatus, when the electronic device is positioned within a preset distance from the personal cloud apparatus, receiving pairing information of the personal cloud apparatus from the personal cloud apparatus via the NFC, performing a pairing operation with the personal cloud apparatus based on the pairing information of the personal cloud apparatus, acquiring information of an AP and transmitting the information of the AP to the personal cloud apparatus to connect the personal cloud apparatus to a network, and when the personal cloud apparatus is connected to the network through the AP, registering the personal cloud apparatus in a registration server.

According to another aspect of the present disclosure, the notification UI may include a manual connection icon notifying a manual connection to the personal cloud apparatus. The receiving of the pairing information of the personal cloud apparatus may include when the manual connection icon is selected, performing a discovery operation for searching for at least one personal cloud apparatus within a preset distance from the electronic device, receiving MAC address information from the searched at least one personal cloud apparatus, when one of the searched at least one personal cloud apparatus is selected, setting a channel through which the electronic device communicates with the selected personal cloud apparatus, transmitting a request signal for requesting a connection to the selected personal cloud apparatus through the channel, and receiving a response signal for responding to the request signal.

According to another aspect of the present disclosure, the setting of the channel may include displaying a search list for selecting the searched at least one personal cloud apparatuses, when one of the at least one cloud apparatus displayed on the search list is selected, displaying a password input UI for inputting a password of the selected personal cloud apparatus, and when the password of the personal cloud apparatus is input into the password input UI, setting the channel through which the electronic device communicates with the selected personal cloud apparatus.

According to another aspect of the present disclosure, when the password input UI is displayed, a password of the selected personal cloud apparatus may be displayed on a display apparatus that is connected to the selected personal cloud apparatus.

According to another aspect of the present disclosure, when one of the searched at least one personal cloud apparatuses is selected, and then a signal generated by selecting a preset button of the selected personal cloud apparatus is received from the selected personal cloud apparatus, the channel through which the electronic device communicates with the selected personal cloud apparatus may be set.

In accordance with another aspect of the present disclosure, an electronic device is provided. The electronic device includes an NFC communicator configured to receive download information of a preset application and pairing information of a personal cloud apparatus from the personal cloud apparatus, a communicator configured to communicate with the personal cloud apparatus and an external server, a display unit, and a controller configured to, when the preset application is executed, control the display unit to display a notification UI notifying that NFC is performed with the personal cloud apparatus, to, when the electronic device is positioned within a preset distance from the personal cloud apparatus, receive pairing information of the personal cloud apparatus from the personal cloud apparatus through the NFC communicator, to perform a pairing operation with the personal cloud apparatus based on the pairing information of the personal cloud apparatus, to control the communicator to acquire information of an AP and transmit the information of the AP to the personal cloud apparatus in order to connect the personal cloud apparatus to a network, and to, when the personal cloud apparatus is connected to the network through the AP, register the personal cloud apparatus in the registration server.

According to another aspect of the present disclosure, the notification UI may include a manual connection icon notifying a manual connection to the personal cloud apparatus. When the manual connection icon of the notification UI is selected, the controller may perform a discovery operation for searching for at least one personal cloud apparatuses within a preset distance from the electronic device, receive MAC address information from the searched at least one personal cloud apparatus, when one of the searched at least one personal cloud apparatus is selected, set a channel through which the electronic device communicates with the selected personal cloud apparatus, transmit a request signal for requesting a connection to the selected personal cloud apparatus through the channel, and control the communicator to receive a response signal for responding to the request signal.

According to another aspect of the present disclosure, the controller may display a search list for selecting the searched at least one personal cloud apparatuses, controls the display unit to, when one of the searched at least one personal cloud apparatuses displayed on the search list is selected, to display a password input UI for inputting a password of the selected personal cloud apparatus, and control the communicator to set the channel through which the electronic device communicates with the selected personal cloud apparatus.

According to another aspect of the present disclosure, when one of the searched at least one personal cloud apparatuses is selected, and then a signal generated by selecting a preset button of the selected personal cloud apparatus is received from the selected personal cloud apparatus through the communicator, the controller may control the communicator to set the channel through which the electronic device communicates with the selected personal cloud apparatus.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 2 is a flowchart illustrating a method of registering a personal cloud apparatus in a registration server through an electronic device by using a Near Field Communication (NFC) if a preset application is not installed according to an embodiment of the present disclosure;

FIG. 4 is a sequence illustrating a method of registering a personal cloud apparatus in a registration server in a personal cloud system according to an embodiment of the present disclosure;

FIG. 6 is a view illustrating a registration message format that is according to a user account when registering the same personal cloud apparatus according to an embodiment of the present disclosure;

FIGS. 14A, 14B, and 14C are views illustrating a method of remotely controlling an external apparatus through an electronic device by using a personal cloud apparatus according to an embodiment of the disclosure.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions or constructions may be omitted for clarity and conciseness.

The terms and words used in the following description and claims are not limited to the bibliographical meanings, but are merely used by the inventor to enable a clear and consistent understanding of the present disclosure. Accordingly, it should be apparent to those skilled in the art that the following description of various embodiments of the present disclosure is provided for illustration purposes only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
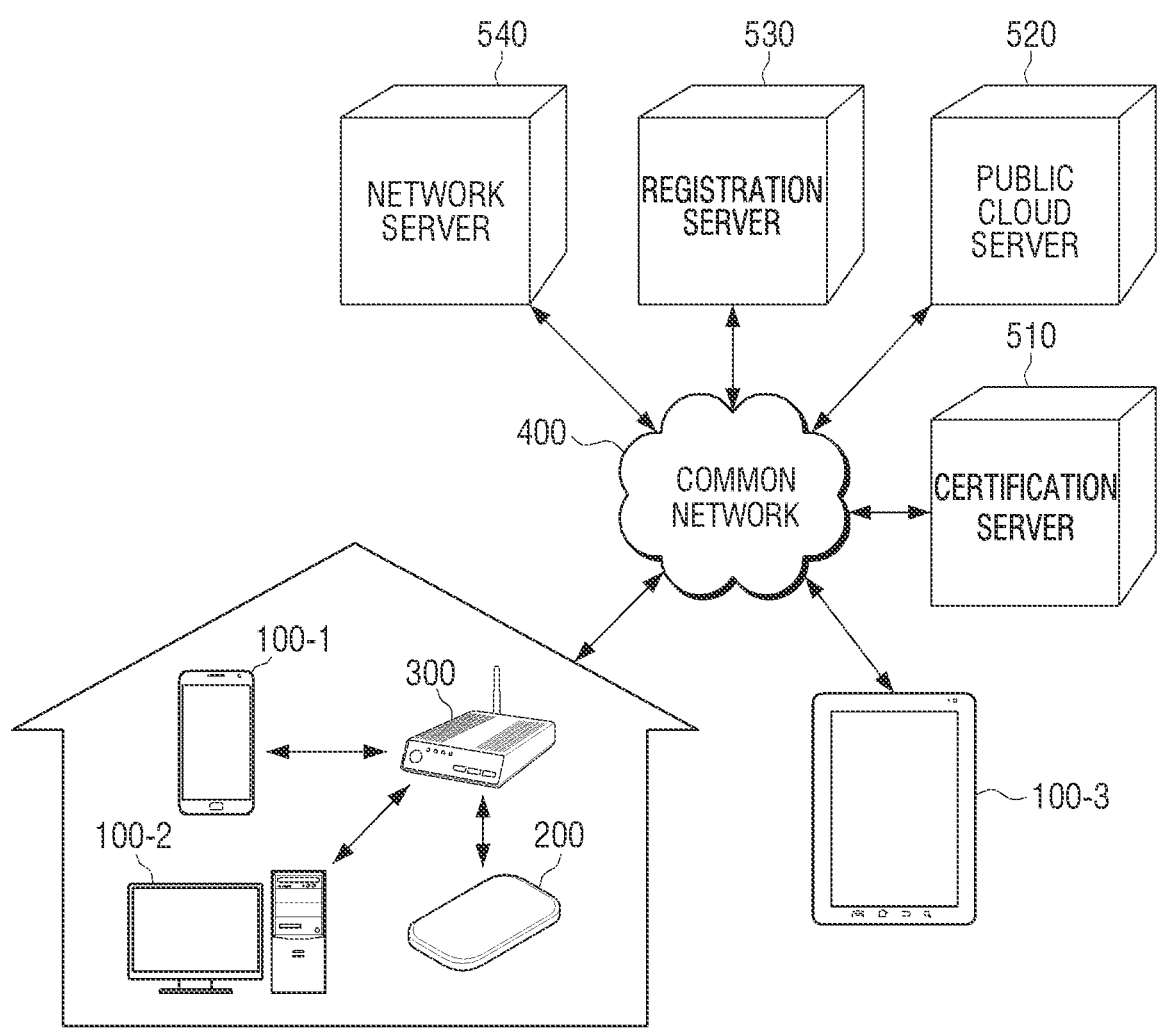
FIG. 1 is a view illustrating a personal cloud system according to an embodiment of the present disclosure.

FIG. 1 is a view illustrating a personal cloud system 10 according to an embodiment of the present disclosure.

Referring to FIG. 1, the personal cloud system 10 includes a plurality of electronic devices 100-1, 100-2, and 100-3, a personal cloud apparatus 200, a home Access Point (AP) 300, a common network 400, a certification server 510, a public cloud server 520, a registration server 530, and a network server 540.

The plurality of electronic devices 100-1, 100-2, and 100-3 may download or upload various types of content by using the personal cloud apparatus 200. The plurality of electronic devices 100-1, 100-2, and 100-3 may directly communicate with the personal cloud apparatus 200 in a home and communicate with the personal cloud apparatus 200 by using the common network 400 and the home AP 300 outside the home. The plurality of electronic devices 100-1, 100-2, and 100-3 may download or upload content (for example, a picture, music, a moving picture, etc.) by using the personal cloud apparatus 200 in the home and outside the home.

The plurality of electronic devices 100-1, 100-2, and 100-3 may be various types of electronic devices, such as a smartphone, a tablet PC, a smart TV, and the like.

The personal cloud apparatus 200 is installed in the home or in an office to store content, so that the plurality of electronic devices 100-1, 100-2, and 100-3. The personal cloud apparatus 200 may directly communicate with the electronic device 100-1, 100-2, and 100-3 to upload or download the content. However, this is only an embodiment; the personal cloud apparatus 200 may communicate with the electronic devices 100-1, 100-2, and 100-3 through the home AP 300 and the common network 400.

The personal cloud apparatus 200 is registered in the registration server 530 based on a user account. The personal cloud apparatus 200 logs in the user account in which a user is registered, to share the content stored in the personal cloud apparatus 200 by using the electronic devices 100-1, 100-2, and 100-3 outside the home.

The home AP 300 mediates connections of the electronic devices 100-1, 100-2, and 100-3 and the personal cloud apparatus 200 to the common network 400, so that the electronic devices 100-1, 100-2, and 100-3 and the personal cloud apparatus 200 share the content outside the home.

The certification server 510 certificates the user account through login operations of the user that are performed through the electronic devices 100-1, 100-2, and 100-3, and transmits information about the user account to the electronic devices 100-1, 100-2, and 100-3 to register the personal cloud apparatus 200 in the registration server 530.

The public cloud server 520 backs up and stores the content stored in the personal cloud apparatus 200.

The registration server 530 registers the plurality of electronic devices 100-1, 100-2, and 100-3 and the personal cloud apparatus 200 based on the user account. For example, the registration server 530 may register the first electronic device 100-1 and the personal cloud apparatus 200 based on user account "A@samsung.com" and register the second electronic device 100-2 and the personal cloud apparatus 200 based on user account "B@samsung.com". The registration server 530 may be registered based on the user account and thus may be referred to as a user portal server.

The registration server 530 may generate a user account list based on the user account, and the user account list may include at least one of a type, a peer Identification (ID), and an IP address of an electronic device.

The network server 540 may mediate communication between the personal cloud apparatus 200 and an external network based on the peer ID and domain information generated by the registration server 530.

Through the personal cloud system 10 as described above, the user may register the personal cloud apparatus 200 in the registration server 530 by using the electronic devices 100-1, 100-2, and 100-3 and download or upload content by using the personal cloud apparatus 200 in the home or outside the home.

A plurality of servers 510, 520, 530, and 540 according to an embodiment of the present disclosure may be realized as different servers, but this is only an embodiment. The plurality of servers 510, 520, 530, and 540 may be realized as any of one to four servers.

A method of registering the personal cloud apparatus 200 in the registration server 530 if a preset application is not installed is described below with reference to FIGS. 2 through 11. A method of registering the personal cloud apparatus 200 in the registration server 530 if a preset application is installed is described below with reference to FIGS. 12 through 13F.

FIG. 2 is a flowchart illustrating a method of registering a personal cloud apparatus in a registration server through an electronic device by using a Near Field Communication (NFC) if a preset application is not installed according to an embodiment of the present disclosure. FIGS. 3A, 3B, 3C, and 3D are views illustrating a User Interface (UI) that is provided when registering a personal cloud apparatus in a registration server through an electronic device by using an NFC if a preset application is not installed according to an embodiment of the present disclosure.

Referring to FIG. 2 and FIGS. 3A-3D, in operation S210, an electronic device 100 determines whether an NFC tagging operation is performed with the personal cloud apparatus 200. The electronic device 100 including an NFC module may determine whether the electronic device 100 exists within a preset distance from the personal cloud apparatus 200 including an NFC module to determine whether the NFC tagging operation is performed with the personal cloud apparatus 200. The NFC is one of several wireless communication technologies. NFC employs a communication method of transmitting data between terminals in a short distance (for example, 10 cm) by using a non-contact communication module using a particular frequency band (13.56 MHz). If the electronic device 100 including the NFC module exists within the preset distance from the personal cloud apparatus 200 including the NFC module, the electronic device 100 may determine whether the NFC tagging operation is performed with the personal cloud apparatus 200.

If it is determined in operation S210 that the NFC tagging operation is performed with the personal cloud apparatus 200, the electronic device 100 receives download information of a preset application and pairing information of the personal cloud apparatus 200 from the personal cloud apparatus 200 by using an NFC in operation S220. The preset application may be an application (hereinafter referred to as a HomeSync application) that allows the electronic device 100 to share content by using the personal cloud apparatus 200, and the download information of the HomeSync application may include at least one of a name, a version, and a download Uniform Resource Locator (URL) of the HomeSync application. The pairing information of the personal cloud apparatus 200 may be MAC address information of the personal cloud apparatus 200 that is used when pairing is performed between the personal cloud apparatus 200 and the electronic device 100.

Figure 3A:
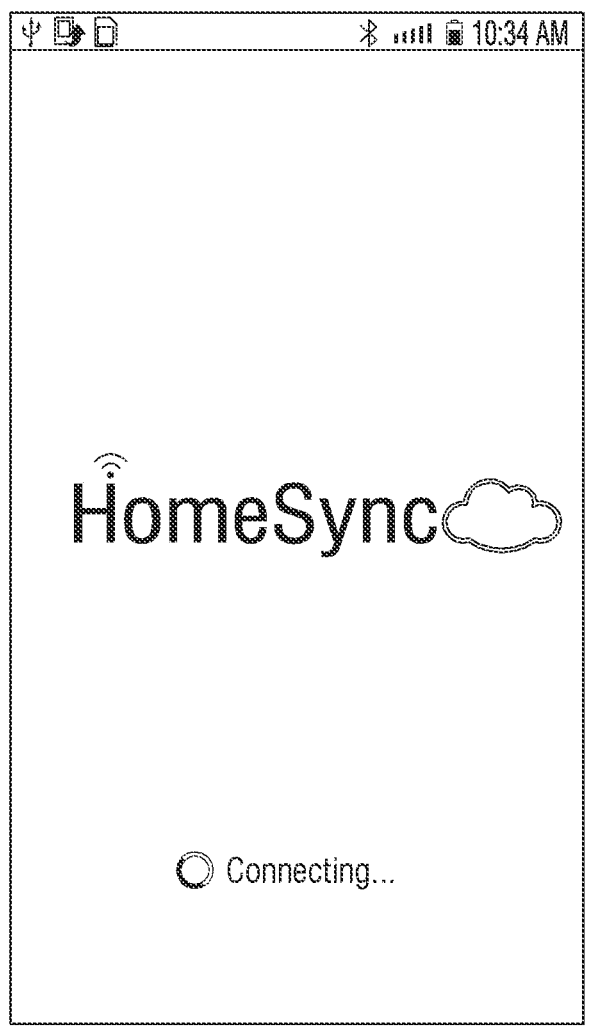
FIGS. 3A, 3B, 3C, and 3D are views illustrating a User Interface (UI) that is provided when registering a personal cloud apparatus in a registration server through an electronic device by using an NFC if a preset application is not installed according to an embodiment of the present disclosure.

In operation S230, the electronic device 100 downloads and executes the preset application by using the download information of the HomeSync application. The electronic device 100 may access an application store based on an URL of a HomeSync application store that may download the HomeSync application and then download the HomeSync application as an updated version of file to automatically execute the HomeSync application. If the HomeSync application is executed, the electronic device 100 may display a HomeSync application loading screen as shown in FIG. 3A on a display screen. If the HomeSync application is executed, the electronic device 100 may perform a login operation through a user input. The electronic device 100 may display a log-in page and log in a particular user account through the log-in page. The electronic device 100 may perform the log-in operation to transmit information (for example, a user account ID and a password) about the user account to the certification server 510.

In operation S240, the electronic device 100 performs a pairing operation with the personal cloud apparatus 200 by using the pairing information of the personal cloud apparatus 200. In detail, the electronic device 100 may perform a Bluetooth pairing operation with the personal cloud apparatus 200 based on the MAC address of the personal cloud apparatus 200. The electronic device 100 receives the pairing information of the personal cloud apparatus 200 by using the NFC without an additional user input. Therefore, the electronic device 100 does not need to perform a Bluetooth discovery operation for performing a pairing operation with a personal cloud apparatus and may immediately perform the Bluetooth pairing operation with the personal cloud apparatus 200 without an additional user input.

In operation S250, the electronic device 100 acquires information of the home AP 300 and transmits the information to the personal cloud apparatus 200. The electronic device 100 may receive the information of the home AP 300 currently connected to the electronic device 100 from the home AP 300 and transmit the information of the home AP 300 to the personal cloud apparatus 200 so as to connect the personal cloud apparatus 200 to the home AP 300. If a signal generated by selecting a preset button of the personal cloud apparatus 200 is received from the personal cloud apparatus 200, the electronic device 100 may transmit the information of the home AP 300 to the personal cloud apparatus 200.

The electronic device 100 may transmit the information of the home AP 300 to the personal cloud apparatus 200 by using different methods according to whether the electronic device 100 has a function of automatically transmitting the information of the home AP 300 to the personal cloud apparatus 200.

If the electronic device 100 has the function of automatically transmitting the information of the home AP 300 to the personal cloud apparatus 200, and a signal generated through a command to select the preset button of the personal cloud apparatus 200 is received from the personal cloud apparatus 200, then the electronic device 100 may transmit the information of the home AP 300 to the personal cloud apparatus 200 without user input. The personal cloud apparatus 200 may generate a random value by using application secrete information of the HomeSync application. The personal cloud apparatus 200 may also transmit the generated random value as a session key to the electronic apparatus 100. If the session key is received, the electronic device 100 may call the encoded information of the home AP 300 of a framework by using the received session key. The information of the home AP 300 is not normally called, the electronic device 100 may request the encoded information of the home AP 300 of the home AP 300. If the encoded information of the home AP 300 is acquired from the framework, the electronic device 100 may transmit the encoded information of the home AP 300 to the personal cloud apparatus 200. The personal cloud apparatus 200 may decode the encoded information of the home AP 300 by using an existing generated session key and access the home AP 300 based on the decoded information of the home AP 300.

Figure 3B:
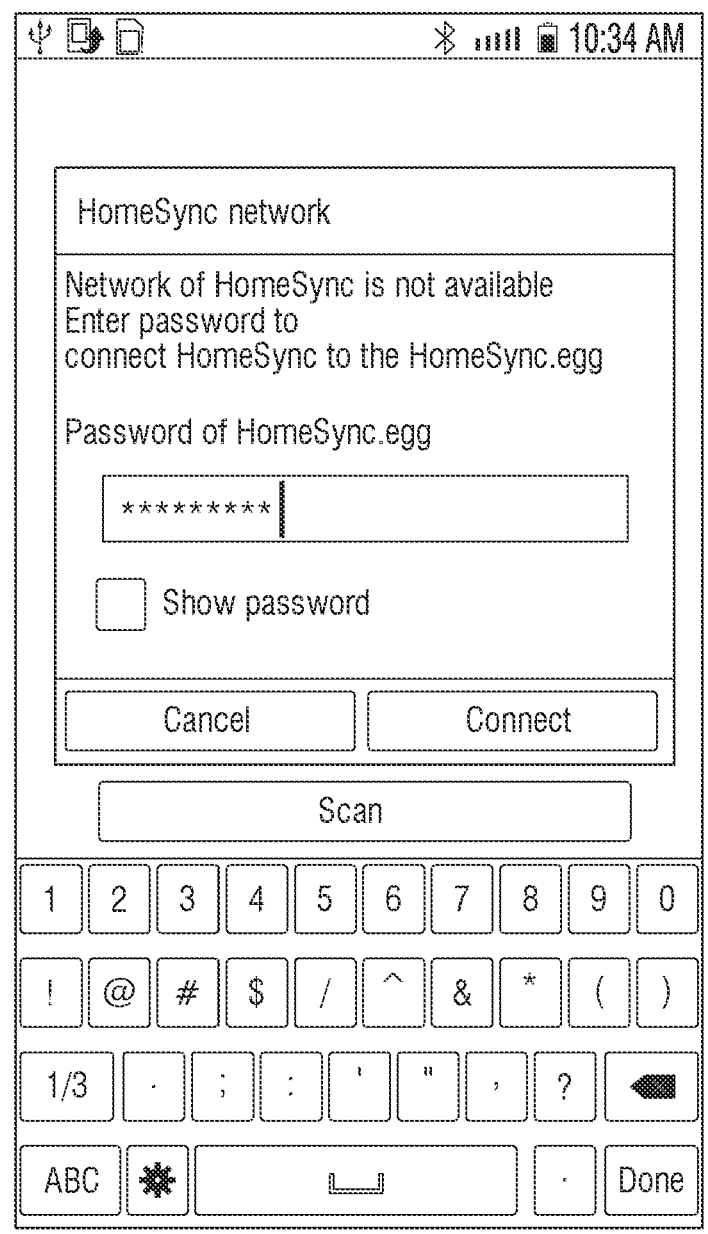

However, if the electronic device 100 does not have the function of automatically transmitting the information of the home AP 300 to the personal cloud apparatus 200, and the signal generated through the command to select the preset button of the personal cloud apparatus 200 is received from the personal cloud apparatus 200, then the electronic device 100 may display a password input UI for inputting a password of the home AP 300 as shown in FIG. 3B. If the password of the home AP 300 is input into the password input UI, the electronic device 100 may transmit the information of the home AP 300 to the personal cloud apparatus 200.

In operation S260, the electronic device 100 determines that the personal cloud apparatus 200 is connected to a network. If the personal cloud apparatus 200 is connected to the home AP 300 based on the information of the home AP 300, the electronic device 100 may determine that the personal cloud apparatus 200 is connected to the network.

In operation S270, the electronic device 100 registers the personal cloud apparatus 200 in a registration server. The electronic device 100 may register the personal cloud apparatus 200 in the registration server 530 based on a user account so as to share content in the home or outside the home by using the personal cloud apparatus 200. A method of registering the personal cloud apparatus 200 in the registration server 530 through the electronic device 100 in described below with reference to FIG. 4.

FIG. 4 is a sequence illustrating a method of registering a personal cloud apparatus in a registration server in the personal cloud system according to an embodiment of the present disclosure.

Referring to FIG. 4, operation S270 of FIG. 2 is shown in more detail. In operation S405, the electronic device 100 logs in the certification server 510 through a particular user account. The user account may be e-mail information (for example, "A@samsung.com") used by a user.

In operation S415, the personal cloud apparatus 200 requests user account information of the certification server 510. The personal cloud apparatus 200 may transmit a user account ID and a password to request the user account information.

In operation S420, the certification server 200 transmits the user account information in response to the request for the user account information. The user account information may include the user account ID, the password, token information, and token secret information.

In operation S425, the electronic device 100 transmits the received user account information and pre-stored MAC address information of the personal cloud apparatus 200 to the registration server 530. The electronic device 100 may transmit the user account information, the MAC address information of the personal cloud apparatus 200, information (for example, a device type, a device model name, etc.) about the personal cloud apparatus 200, and information about a service type.

In operation S430, the registration server 530 registers the personal cloud apparatus 200. The registration server 530 determines whether the personal cloud apparatus 200 is registered in the registration server 530, based on the MAC address information that is characteristic information of the personal cloud apparatus 200. If it is determined that the personal cloud apparatus 200 is not registered in the registration server 530, the registration server 530 registers the personal cloud apparatus 200 through the user account that is logged in.

In operation S435, the registration server 530 generates a peer ID and transmits the peer ID to the network server 540 so as to connect the personal cloud apparatus 200 to the network server 540. The peer ID may be generated by using the MAC address information that is the characteristic information of the personal cloud apparatus 200. The peer ID may correspond to the MAC address information of the personal cloud apparatus 200.

In operation S440, the network server 540 transmits a response signal in response to the transmission of the peer ID.

In operation S445, the registration server 530 transmits domain information of the network server 540 and the peer ID to the electronic device 100. The domain information of the network server 540 is domain information through which the personal cloud apparatus 200 access the network server 540.

In operation S450, the electronic device 100 transmits the domain information of the network server 540 and the peer ID information to the personal cloud apparatus 200. In operation S455, the personal cloud apparatus 200 performs a connection to the network server 540 based on the domain information of the network server 540 and the peer ID information.

Through operations as described above with reference to FIG. 4, a user may register the personal cloud apparatus 200 in the registration server 530 by using the electronic device 100. Also, the personal cloud apparatus 200 may be connected to the network server 540, and thus the user may share content in the home or outside the home.

Figure 3C:
Figure 3D:
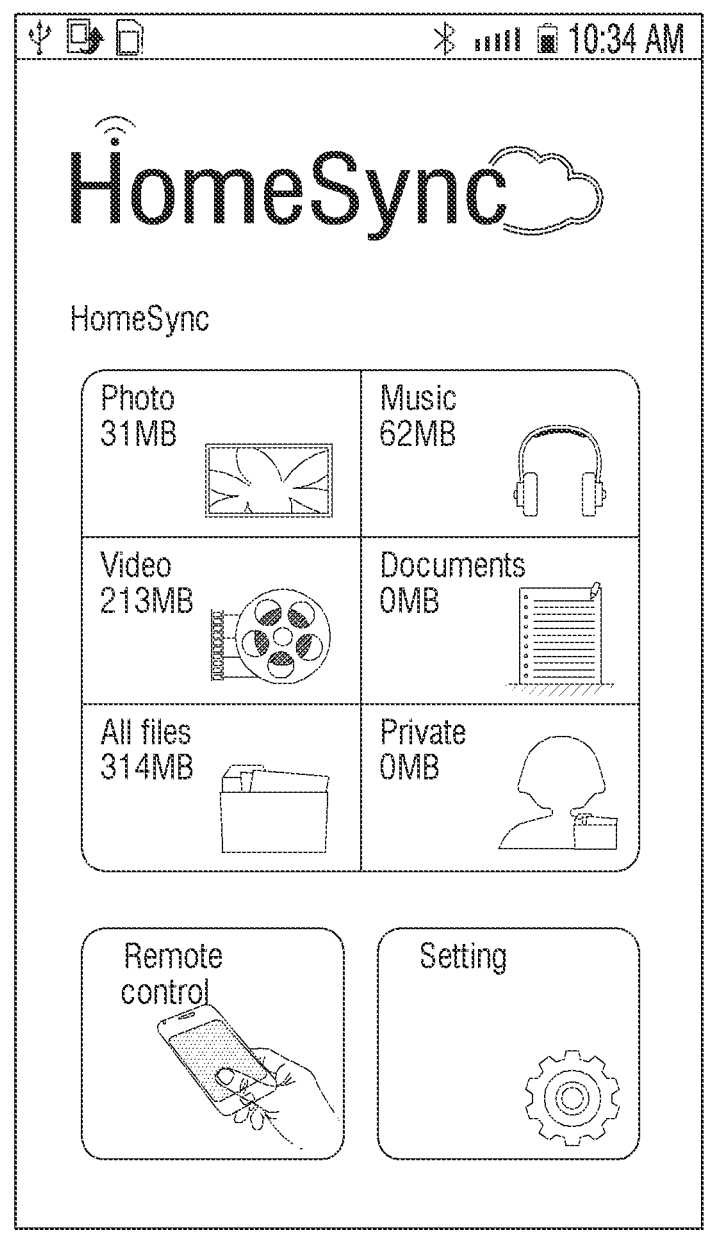

When the electronic device 100 connects the personal cloud apparatus 200 to the network to register the personal cloud apparatus s200 in the registration server 530, the electronic device 100 may display a connection notification UI as shown in FIG. 3C. If the electronic device 100 is registered in the registration server 530 and then accesses the personal cloud apparatus 200 by using the HomeSync application, the electronic device 100 may display a UI indicating content information and setting information stored in the personal cloud apparatus 200 as shown in FIG. 3D.

When a registration process as described with reference to FIGS. 2 through 4 is performed, the user may register the personal cloud apparatus 200 in the registration server 530 through only an NFC tagging operation and an input for pressing a button of the personal cloud apparatus 200. The personal cloud apparatus 200 may be registered in the registration server 530 through a tagging operation and a button selection without performing an initial setting work of a network existing in an existing cloud service. Accordingly, convenience of the user may be increased.

According to an embodiment of the present disclosure, the registration server 530 may register the personal cloud apparatus 200 and the electronic device 100 based on a user account. A plurality of users may register the personal cloud apparatus 200 by using a plurality of user accounts to share the personal cloud apparatus 200.

A method of registering the personal cloud apparatus 200 through another user account by an additional user if one user registers the personal cloud apparatus 200 through a particular user account is the same as described above with reference to FIGS. 2 through 4.

However, when the registration server 530 registers the personal cloud apparatus 200, the registration server 530 may generate a user account list to register the personal cloud apparatus 200 and the electronic device 100 according to a user account. The registration server 530 may group and manage the personal cloud apparatus 200 and the electronic device 100 based on the user account. A method of registering the personal cloud apparatus 200 through the registration server 530 according to the user account is described below with reference to FIG. 5.

Figure 5:
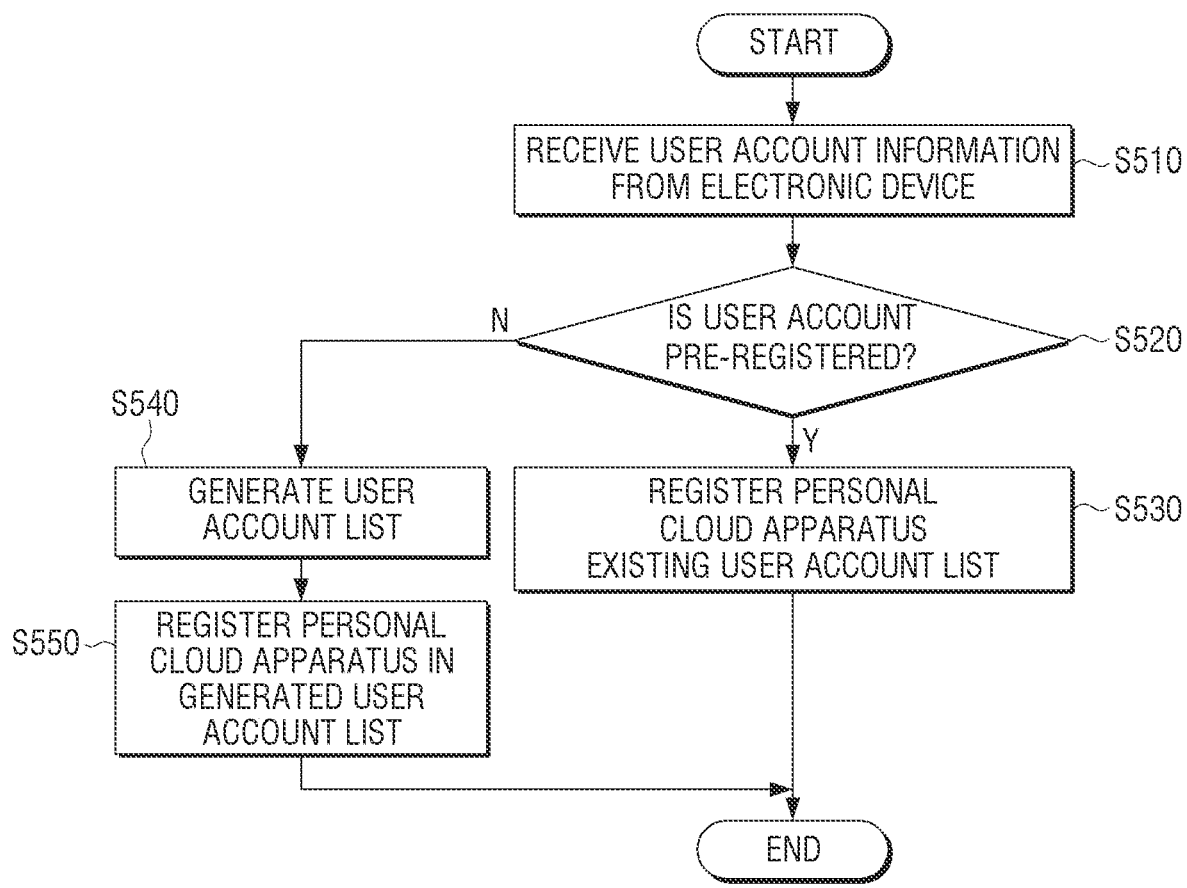
FIG. 5 is a flowchart illustrating a method of registering a personal cloud apparatus according to a user account through a registration server according to an embodiment of the present disclosure.

FIG. 5 is a flowchart illustrating a method of registering a personal cloud apparatus according to a user account through a registration server according to an embodiment of the present disclosure.

Referring to FIG. 5, in operation S510, the registration server 530 receives user account information from the electronic device 100. Operation S510 of FIG. 5 may correspond to operation S425 of FIG. 4.

In operation S520, the registration server 530 determines whether a user account is pre-registered. The registration server 530 may determine whether the user account of the received user account information logged in the certification server 510 is pre-registered.

If it is determined in operation S520 that the user account is pre-registered, the registration server 530 registers the personal cloud apparatus 200 in an existing user account information list in operation S530.

However, if it is determined in operation S520 that the user account is not pre-registered, the registration server 530 generates a user account list in operation S540 and registers the personal cloud apparatus 200 in the generated user account list in operation S550.

Figure 7:
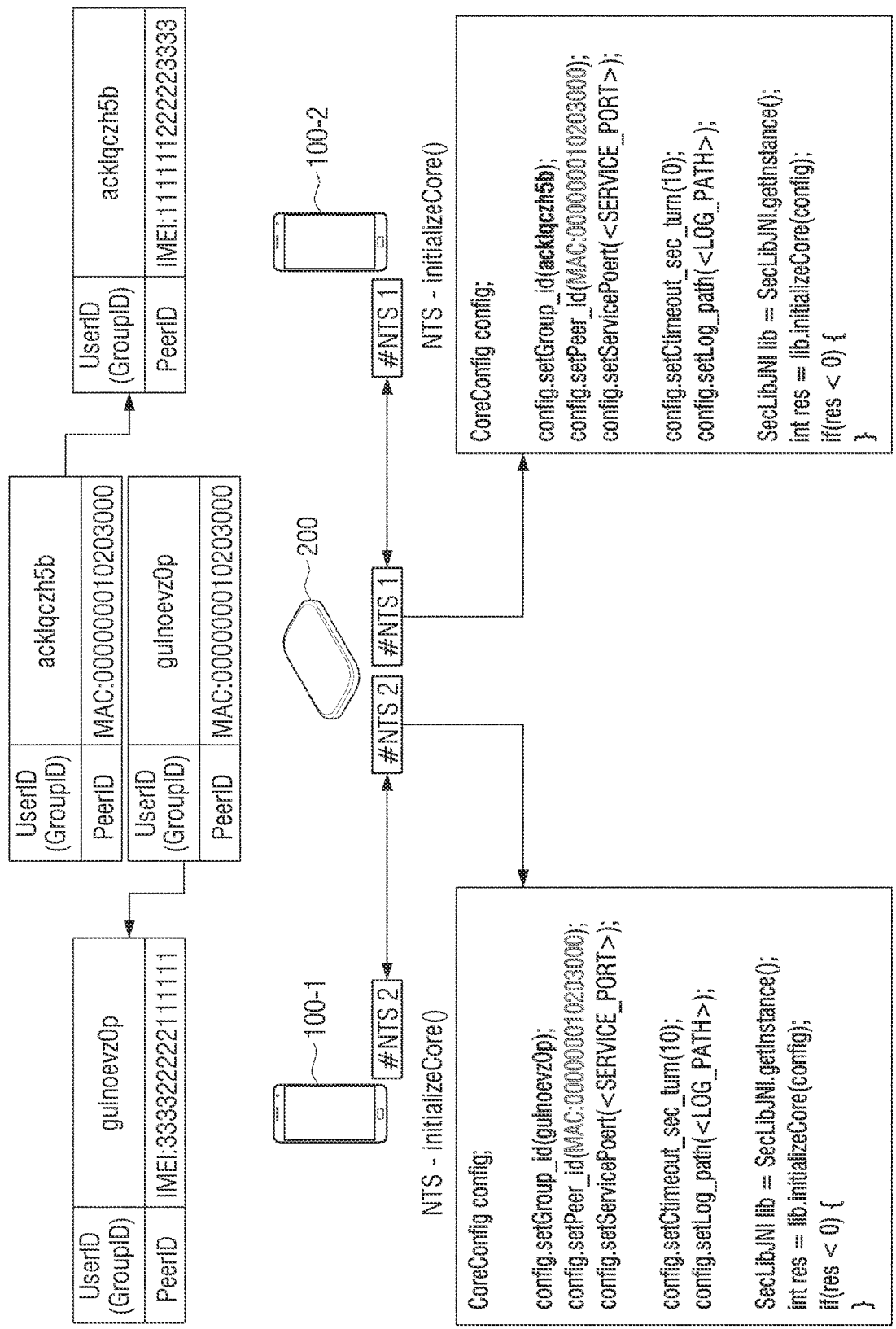
FIG. 7 is a view illustrating a method of setting a user account and a peer Identification (ID) between a personal cloud apparatus and an electronic device, according to an embodiment of the present disclosure.

FIG. 6 is a view illustrating a registration message format that is according to a user account when registering the personal cloud apparatus 200 through different user accounts according to an embodiment of the present disclosure. FIG. 7 is a view illustrating a method of setting a user account and a peer Identification (ID) between a personal cloud apparatus and an electronic device, according to an embodiment of the present disclosure.

Referring to FIG. 6 and FIG. 7, the user ID of user account A is "acklqczh5b", and the user ID of user account B is "ulnoevz0p". Although user accounts are different from one another, the same personal cloud apparatus 200 is registered, and thus MAC address information (for example, MAC: 00000000001) of the personal cloud apparatus 200 is the same.

The personal cloud apparatus 200 may maintain two Network Server (NTS) access modules as shown in FIG. 7 to simultaneously maintain a user account using the first electronic device 100-1 and a user account using the second electronic device 100-2.

A peer ID through which the personal cloud apparatus 200 accesses an NTS may be generated based on the MAC address information of the personal cloud apparatus 200 regardless of a user account.

For example, as shown in FIG. 7, a user ID of the first electronic device 100-1 of user account B registered in the registration server 530 is "gulnoevz0p", a peer ID of the first electronic device 100-1 is "IMEI:3333222222111111", a user ID of the personal cloud apparatus 200 of user account B is "gulnoevz0p, and a peer ID of the personal cloud apparatus 200 is "MAC:000000010203000". A user ID of the second electronic device 100-2 of user account A registered in the registration server 530 may be "acklqczh5b", a peer ID of the second electronic device 100-2 may be "IMEI: 111111222223333", a user ID of the personal cloud apparatus 200 of the user account A may be "acklqczh5b", and a peer ID of the personal cloud apparatus 200 may be "MAC:000000010203000".

As shown in FIG. 7, although different user accounts (or different user IDs) are registered, the same personal cloud apparatus 200 may be given the same peer ID. Accordingly, a plurality of users may use the same personal cloud apparatus 200 by using different user accounts.

Figure 8:
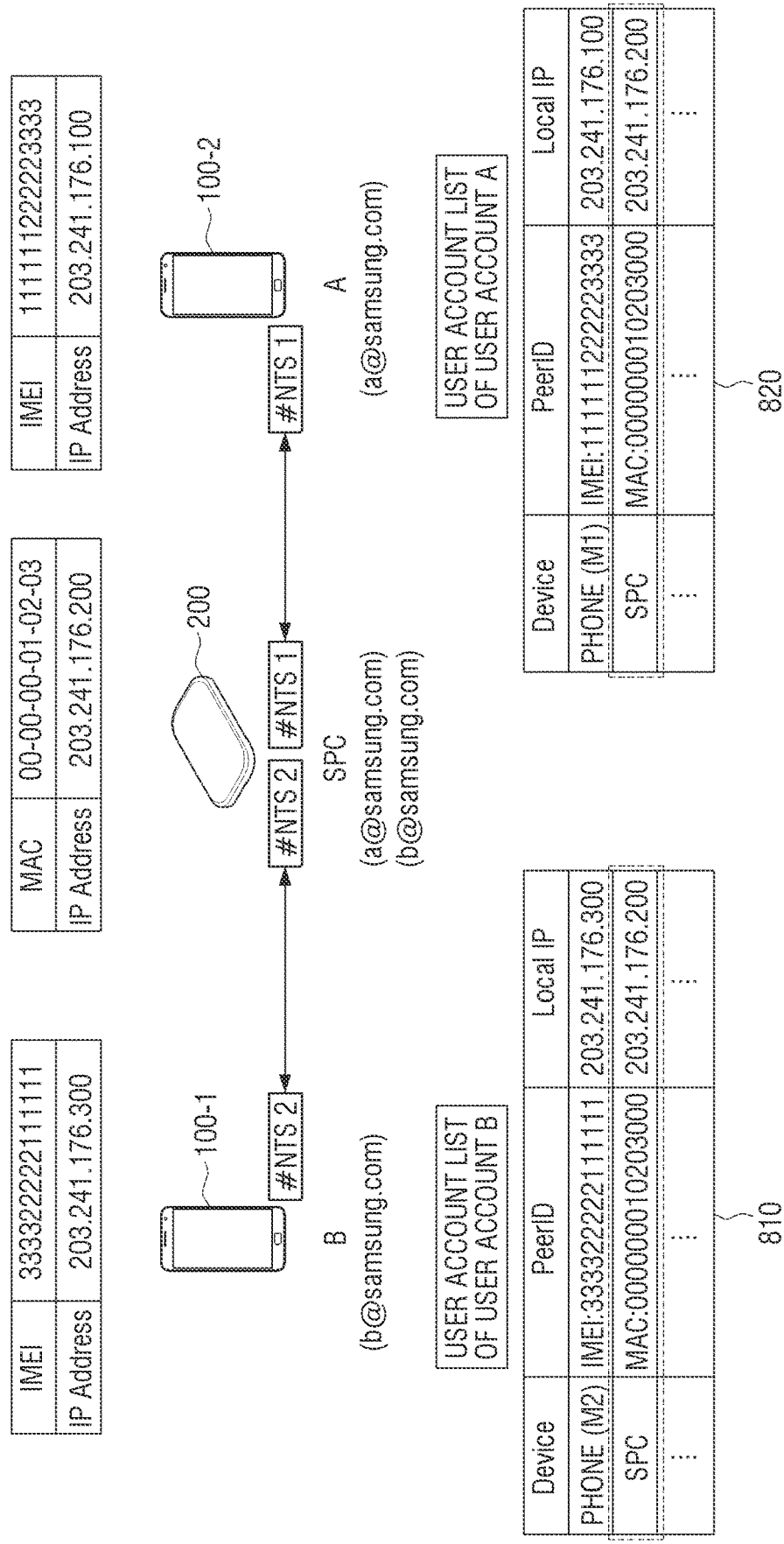
FIG. 8 is a view illustrating a user account list stored in a registration server according to a user account according to an embodiment of the present disclosure.

FIG. 8 is a view illustrating a user account list stored in the registration server 530 according to user accounts according to an embodiment of the present disclosure.

Referring to FIG. 8, the personal cloud apparatus 200 registered in different user accounts stores the same peer ID information "MAC:000000010203000" and the same local IP information "203.241.176.200" from a user account list 810 of user account A and a user account list 820 of user account B.

Accordingly, a plurality of electronic devices 100-1 and 100-2 may access the personal cloud apparatus 200 by using peer information of the personal cloud apparatus 200 registered in the registration server 530.

As shown in FIGS. 5 through 8, the electronic device 100 and the personal cloud apparatus 200 may be grouped based on user accounts, and a peer ID may be generated based on MAC address information of the personal cloud apparatus 200, so that a plurality of users shares the same personal cloud apparatus 200.

Structures of the electronic device 100 and the personal cloud apparatus 200 are described below with reference to FIGS. 9 and 10.

Figure 9:
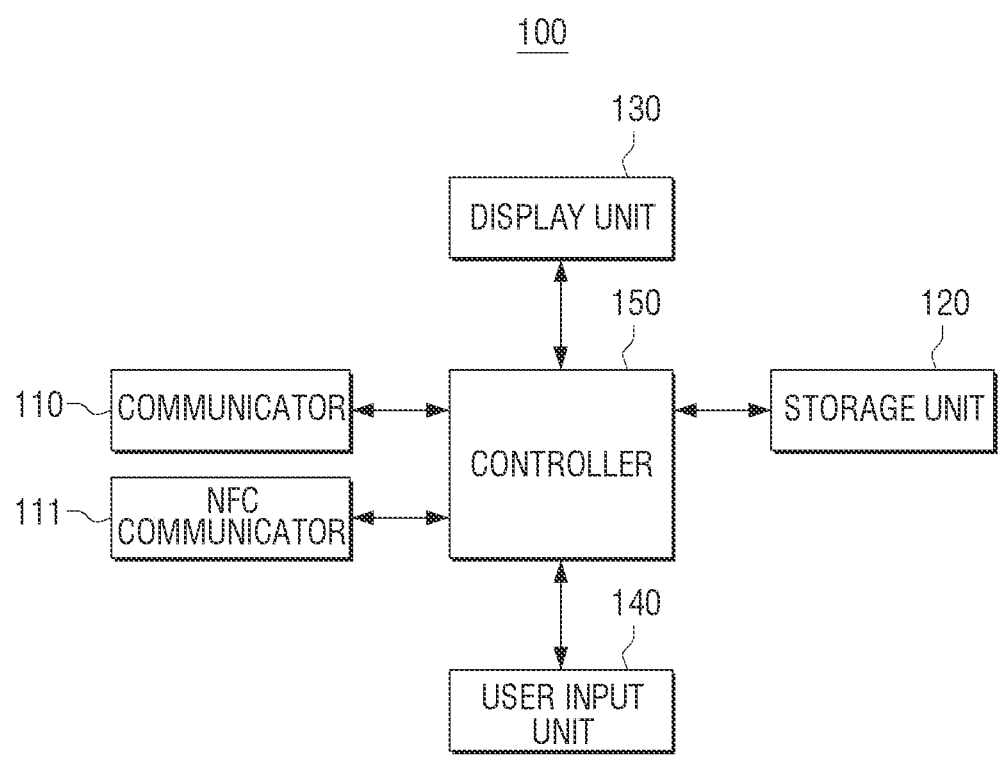
FIG. 9 is a block diagram illustrating a structure of an electronic device according to an embodiment of the present general inventive concept.

FIG. 9 is a block diagram illustrating a structure of an electronic device according to an embodiment of the present disclosure.

Referring to FIG. 9, the electronic device 100 includes a communicator 110, an NFC communicator 111, a storage unit 120, a display unit 130, a user input unit 140, and a controller 150. The electronic device 100 is an apparatus that plays various types of content and may be realized as various types of apparatuses, such as a smartphone, a tablet PC, a smart TV, etc.

FIG. 9 synthetically illustrates various types of elements of the electronic device 100 that is an apparatus having a personal cloud service function. According to various embodiments of the present disclosure, some of the elements of FIG. 9 may be omitted or changed, or other types of elements may be added.

The communicator 110 communicates with the personal cloud apparatus 200, the home AP 300, and external servers 510, 520, 530, and 540. The communicator 110 may use a Bluetooth interface to communicate with the personal cloud apparatus 200 and use a WiFi interface to communicate with the external servers 510, 520, 530, and 540. However, the present disclosure is not limited thereto. For example, the communicator 110 may use a WiFi interface and a Zigbee interface to communicate with the personal cloud apparatus 200 and use various wireless communication standards, such as IEEE, Zigbee, $3^{rd}$ Generation (3G), $3^{rd}$ Generation Partnership Project (3GPP), Long Term Evolution (LTE), and the like, to communicate with the external servers 510, 520, 530, and 540

The NFC communicator 111 receives download information of a HomeSync application and pairing information of the personal cloud apparatus 200 from the personal cloud apparatus 200 through an NFC tagging operation of a user. The download information of the HomeSync application may include at least one of a name, a version, and a download URL of the HomeSync application. The pairing information of the personal cloud apparatus 200 may be MAC address information of the personal cloud apparatus 200.

The storage unit 120 stores various types of data and software modules for controlling the electronic device 100. The storage unit 120 includes a plurality of software modules 1120 through 1126 shown in FIG. 11 to register the personal cloud apparatus in the registration server 530 and share various types of content by using the personal cloud apparatus 200.

The display unit 130 outputs images under control of the controller 150. For example, the display unit 130 may display pictures, video, or the like. When the electronic device 100 performs a pairing operation with the personal cloud apparatus 200 and registers the personal cloud apparatus 200 in the registration server 530, the display unit 130 may display UIs as shown in FIGS. 3A through 3D and FIGS. 13A through 13F.

The user input unit 140 may receive a user command for controlling the electronic device 100. The user unit 140 may receive a user command that is to execute an application for registering the personal cloud apparatus 200 in the registration server 530. If a plurality of personal cloud apparatuses are searched, the user input unit 140 may receive a user command for selecting one of the plurality of personal cloud apparatuses that are searched.

According to an embodiment of the present general inventive concept, the user input unit 140 may be realized as a touch screen, but this is only an embodiment. The user input unit 140 may be realized as various types of input units such as a mouse, a pointing device, a motion input unit, a button, and the like.

The controller 150 controls an overall function of the electronic device 100 according to the user command input through the user input unit 140. The controller 150 downloads and executes a HomeSync application received through the NFC communicator 111 by using download information of the HomeSync application. If the HomeSync application is executed, the controller 150 performs a pairing operation with the personal cloud apparatus 200 by using the pairing information of the personal cloud apparatus 200 received through the NFC communicator 111. The controller 150 automatically performs the pairing operation with the personal cloud apparatus 200 by using pairing information of the personal cloud apparatus 200 received through an existing NFC, and thus an additional user input for Bluetooth pairing is not needed.

The controller 150 may control the communicator 110 to acquire information of the home AP 300 (for example, an SSID, a password, etc. of the home AP 300) and transmit the information of the home AP 300 to the personal cloud apparatus 200 to connect the personal cloud apparatus 200 to a network. The controller 150 may transmit the information of the home AP 300 to the personal cloud apparatus 200 through different processes according to whether the electronic device 100 has a function of automatically transmitting the information of the home AP 300 to the personal cloud apparatus 200.

If the electronic device 100 has the function of automatically transmitting the information of the home AP 300 to the personal cloud apparatus 200, and a signal generated by a command to select a preset button of the personal cloud apparatus 200 is received from the personal cloud apparatus 200, then the controller 150 may transmit the information of the home AP 300 to the personal cloud apparatus 200 without a user input. If the personal cloud apparatus 200 generates a random value by using application secret information of the HomeSync application and transmits the generated random value as a session key to the electronic device 100, then the controller 150 may call the encoded information of the home AP 300 of a framework by using the session key received through the communicator 110. If the information of the home AP 300 is not normally called, the controller 150 may request the encoded information of the home AP 300 of the home AP 300. If the encoded information of the home AP 300 is acquired from the framework, the controller 150 may control the communicator 110 to transmit the information of the home AP 300 to the personal cloud apparatus 200. Accordingly, the personal cloud apparatus 200 may decode the encoded information of the home AP 300 received from the electronic device 100 by using an existing generated session key and access the home AP 300 based on the decoded information of the home AP 300.

However, if the electronic device 100 does not have the function of automatically transmitting the information of the home AP 300 to the personal cloud apparatus 200, and the signal generated by the command to select the preset button of the personal cloud apparatus 200 is received from the personal cloud apparatus 200, then the controller 150 may control the display unit 130 to display the password input UI for inputting a password of the home AP 300 as shown in FIG. 3B. If the password of the home AP 300 is input into the password input UI, the controller 150 may control the communicator 110 to transmit the information of the home AP 300 to the personal cloud apparatus 200.

If the personal cloud apparatus 200 is connected to the network through the home AP 300, the controller 150 registers the personal cloud apparatus 200 in the registration server. If a user account logs in the certification server 510, the controller 150 may receive user account information from the certification server 510 through the communicator 110. The user account information may include a user ID, a password, token information, and token secret information. The controller 150 may transmit the user account information and a pre-stored MAC address to the registration server 520 to register the personal cloud apparatus 200 in the registration server 530. If the personal cloud apparatus 200 is registered in the registration server 300 by using the user account information and the MAC address, the controller 150 may control the communicator 110 to receive domain information and peer ID information of the network server 540 that may be accessed by the personal cloud apparatus 200 from the registration server 510 and transmit the received domain information and peer ID information to the personal cloud apparatus 200.

Figure 10:
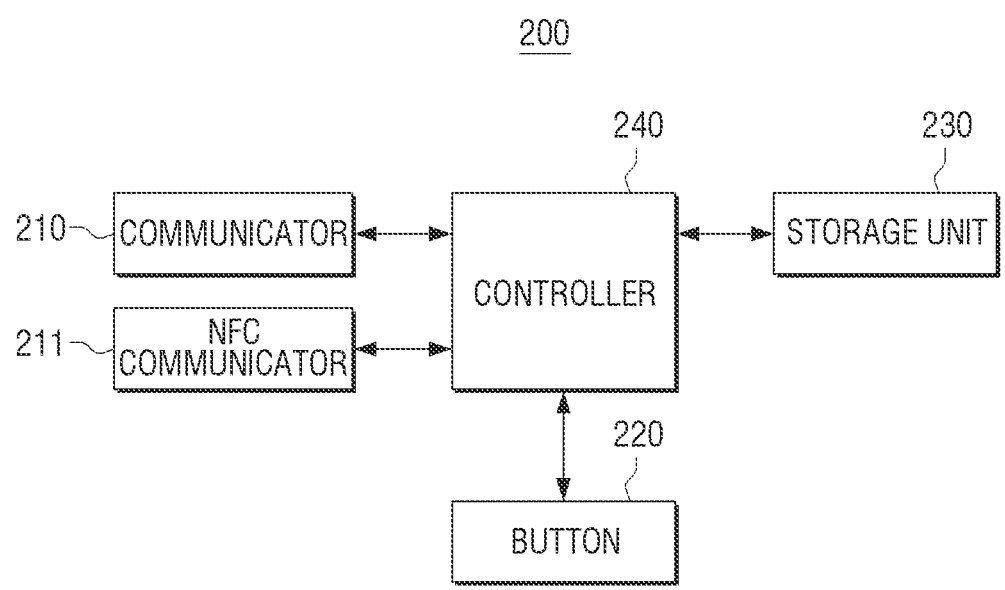
FIG. 10 is a block diagram illustrating a structure of a personal cloud apparatus according to an embodiment of the present disclosure.

FIG. 10 is a block diagram illustrating a structure of a personal cloud apparatus according to an embodiment of the present disclosure.

Referring to FIG. 10, the personal cloud apparatus 200 includes a communicator 210, an NFC communicator 211, a button 220, a storage unit 230, and a controller 240.

The communicator 210 may communicate with the electronic device 100 and the home AP 300. The communicator 210 may use at least one of a WiFi interface, a Bluetooth interface, and a Zigbee interface to communicate with the electronic device 100 and the home AP 300.

The NFC communicator 211 transmits download information of a HomeSync application and pairing information of the personal cloud apparatus 200 stored in the storage unit 230 through an NFC tagging operation of a user. The download information of the HomeSync application may include at least one of a name, a version, and a download URL of the HomeSync application. The pairing information of the personal cloud apparatus 200 may be MAC address information of the personal cloud apparatus 200.

The button 220 may receive a user command. The button 220 may receive a user command for performing pairing with the electronic device 100 or a user command for acquiring the information of the home AP 300.

Figure 11:
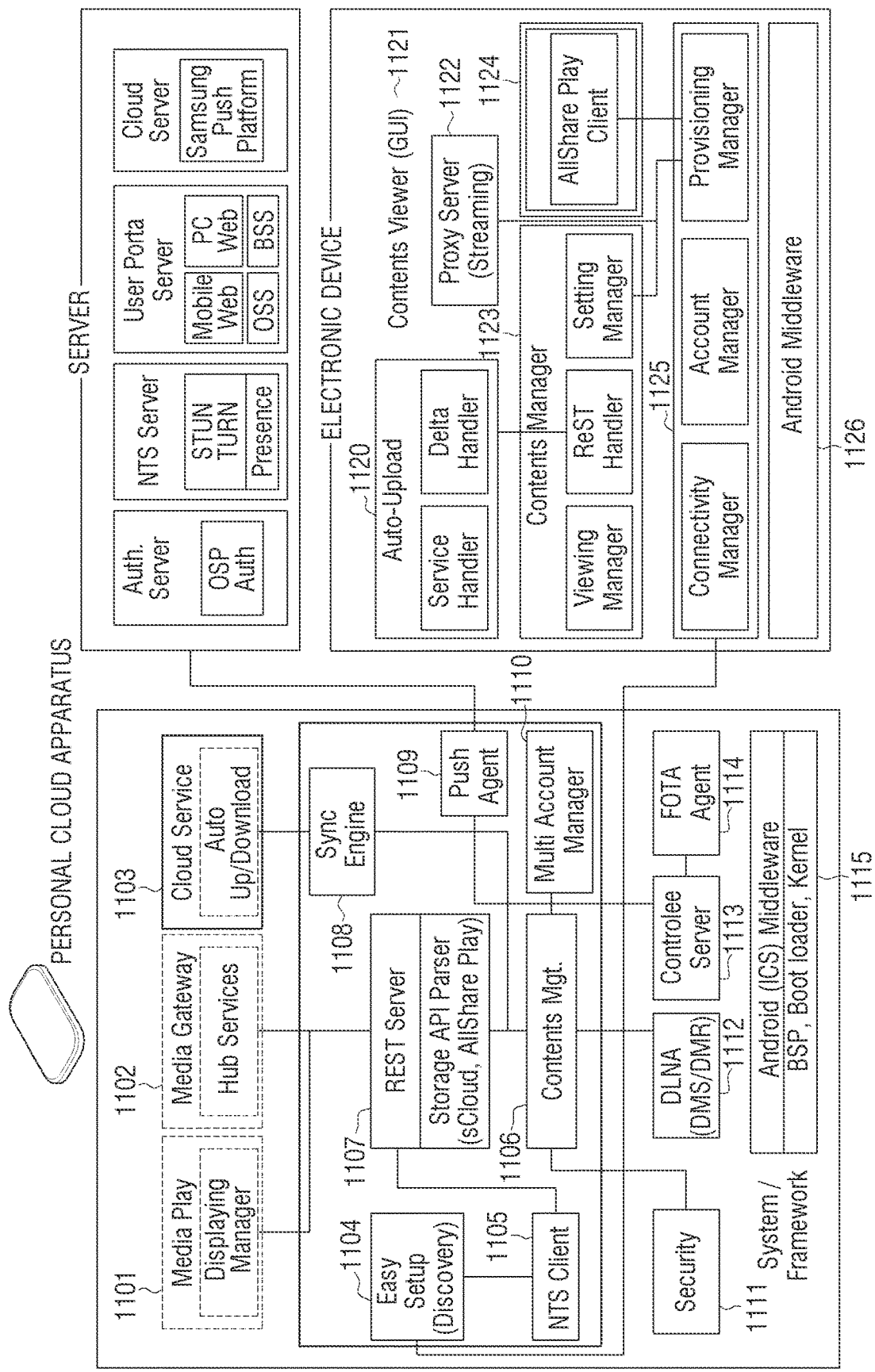
FIG. 11 is a view illustrating a soft module configuration of a personal cloud system according to an embodiment of the present disclosure.

The storage unit 230 stores various types of data and various types of software modules for controlling the personal clod apparatus 200. The storage unit 230 includes a plurality of software modules 1101 through 1115 as shown in FIG. 11 to register the personal cloud apparatus 200 in the registration server 530 and share various types of content by using the personal cloud apparatus 200.

The storage unit 230 may also store the download information of the HomeSync application and the pairing information of the personal cloud apparatus 200.

The controller 240 controls an overall operation of the personal cloud apparatus 200. If the button 220 is selected, the controller 240 may perform a pairing operation with the electronic device 200 through a Bluetooth interface. A method of performing a pairing operation by using a Bluetooth interface has been described above with reference to FIGS. 2 through 4, and thus a repeated description thereof is omitted.

If the personal cloud apparatus 200 is paired with the electronic device 100, the controller 240 receives information of the home AP 300 (for example, an SSID, a password, etc. of the home AP 300) from the electronic device 100 through the communicator 210 and performs a connection to the home AP 300 by using the received information of the home AP 300. The controller 240 may transmit the MAC address information to the electronic device 100 through the communicator 210 to register the personal cloud apparatus 200 in the registration server 530.

If the personal cloud apparatus 200 is registered in the registration server 530, the controller 240 may access the network server 540 based on the domain information and the peer ID information received from the electronic device 100, so that at least one electronic device shares content.

FIG. 11 is a view illustrating a software module configuration of a personal cloud system according to an embodiment of the present disclosure.

Referring to FIG. 11, the personal cloud apparatus 200 stores a media play module 1101, a media gateway module 1102, a cloud service module 1103, an easy setup module 1104, an NTS client module 1105, a content Management (Mgt) module 1106, a rest server module and storage Application Program Interface (API) parser module 1107, a sync engine module 1108, a push agent module 1109, a multi account manager module 1110, a security module 1111, a Digital Living Network Alliance (DLNA) module 1112, a controlee server module 1113, a Firmware Over the Air (FOTA) agent module 1114, and a middleware module and BSP, Kernel, Boot loader module 1115.

The middleware module and BSP, Kernel, Boot loader module 115 manages booting of a system and a file system sets firmware of the system such as network setting, graphic setting, or the like. The security module 111 sets an authority to encode and/or decode of content and access the content. The DLNA module 1112 processes a multimedia standard protocol for sharing the content. The controlee server module 113 receives a remote control command of a client. The FOTA agent module 1114 manages a firmware update of the personal cloud apparatus 200.

The easy setup module 1104 manages a protocol for communication with the electronic device 100 to register the personal cloud apparatus 200 in the registration server 530. The NTS client module 1105 manages a connection to the network server 540 based on the peer ID. The content Mgt module 1106 controls an interface with a media player that plays stored content. The rest server module and storage API parser module 1107 operates as a classifier that receives a command transmission format such as playing of content from the client, processes the command transmission format, analyzes an API of a message requested through a server to handle the content, and divides and handles a content into a share area and a personal area. The sync engine module 1108 maintains a content synchronization with the public cloud server 520 and the client. The push agent module 1109 notifies updated content such as changes of content, changes of a user account list, and the like. The multi account manager module 1110 manages a plurality of user accounts.

The media play module 1101 plays content through an output device (for example, a smart TV). The media gateway module 1102 operates as a content herb of music, an image, etc. The cloud service module 1103 manages setting automatic uploading and automatic downloading of content.

A server end includes an authentication server, an NTS, a user portal server, and a public cloud server.

The electronic device 100 includes an auto upload module 1120, a content viewer module 1121, a proxy server module 1122, a content manager module 1123, an allshare play client module 1124, an easy setup solution module 1125, and an Android middleware module 1126.

The Android middleware module 1126 manages booting of a system and a file system and sets firmware of the system such as network setting, graphic setting, although. Although described herein with respect to the Android platform, other embodiments of the present invention may be compatible with various mobile platforms, such as Apple™ iOS, Microsoft™ Windows Phone™, and the like.

The easy setup solution module 1125 takes charge of network setting such as WiFi, Bluetooth, or the like, and includes a connectivity manager module that identifies a network type when the electronic device 100 is connected to the personal cloud apparatus 200, an account manager module that manages a user account registering the personal cloud apparatus 200, and a provisioning manager module that registers the personal cloud apparatus 200 in the registration server 530, the certification server 510, and the network server 540.

The allshare play client module 1124 performs an interface with a compatible application that may access the personal cloud apparatus 200.

The content manager module 1123 includes a viewing manager module that manages playing and controlling of content on the electronic device 100, a ReST handler module that transmits a request for playing content of the personal cloud apparatus 200, and a setting manager module that manages setting of automatic uploading and automatic downloading.

The proxy server module 1122 manages transmission of information with a player installed in the electronic device 100 when playing content.

The content viewer module 1121 generates a Graphical User Interface (GUI) for playing the content.

The auto upload module 1120 includes a service handler module that manages a cycle for setting and performing automatic or manual uploading and a delta handler module that manages new information of updated content.

Accordingly, the electronic device 100 and the personal cloud apparatus 200 may share content stored in the personal cloud apparatus 200 in the home or outside the home by using software modules as described above.

A method of registering the personal cloud apparatus 200 in a registration server through the electronic device 100 if a HomeSync application is installed according to another embodiment of the present disclosure is described below with reference to FIG. 12.

Figure 12:
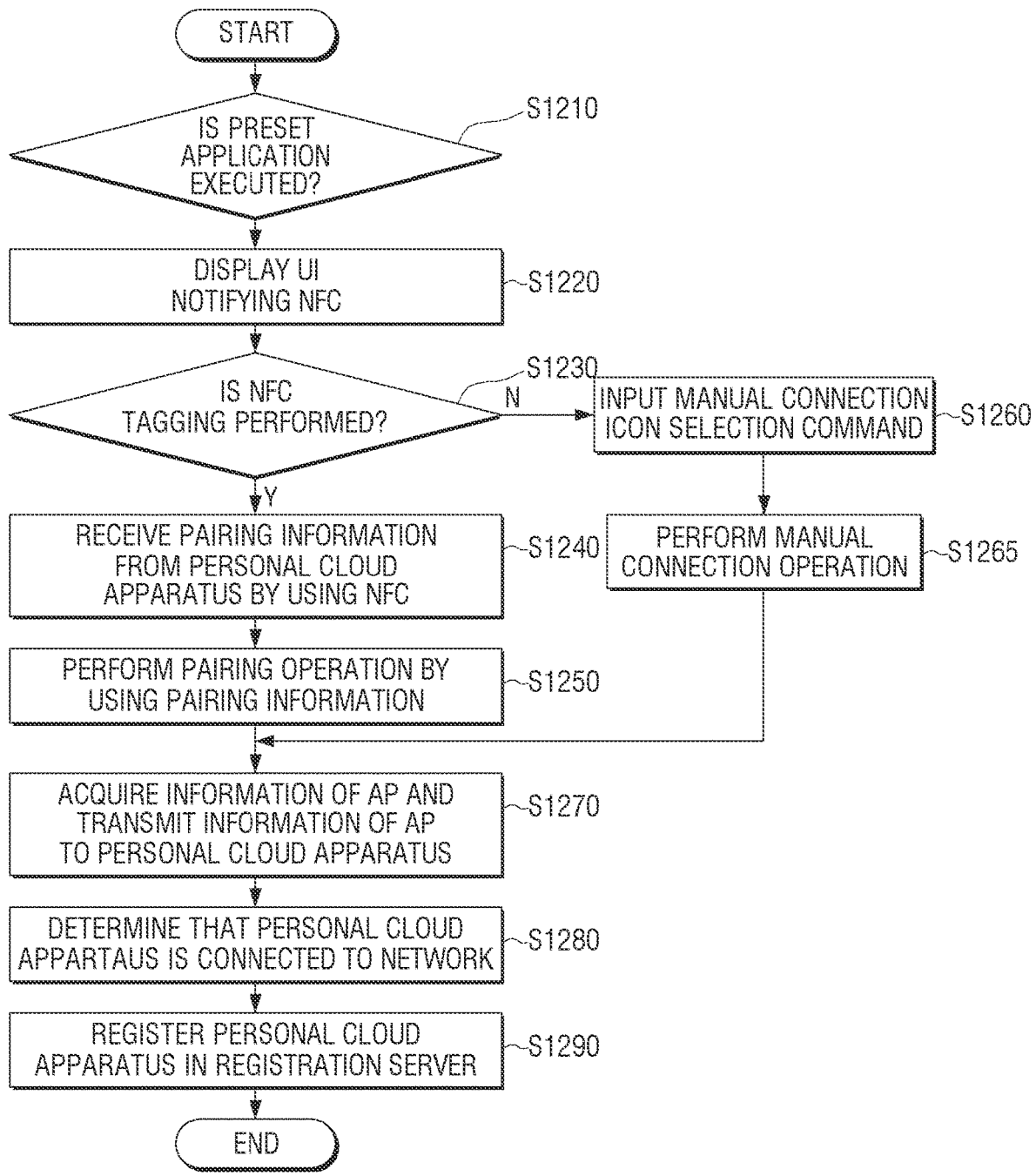
FIG. 12 is a flowchart illustrating a method of registering a personal cloud apparatus in a registration server through an electronic device if a preset application is installed according to another embodiment of the present disclosure.

FIG. 12 is a flowchart illustrating a method of registering a personal cloud apparatus in a registration server through an electronic device if a preset application is installed according to another embodiment of the present disclosure.

FIGS. 13A, 13B, 13C, 13D, 13E, and 13F are views illustrating a UI that is provided when registering a personal cloud apparatus in a registration server through an electronic device if a preset application is installed according to an embodiment of the present disclosure.

Figure 13A:
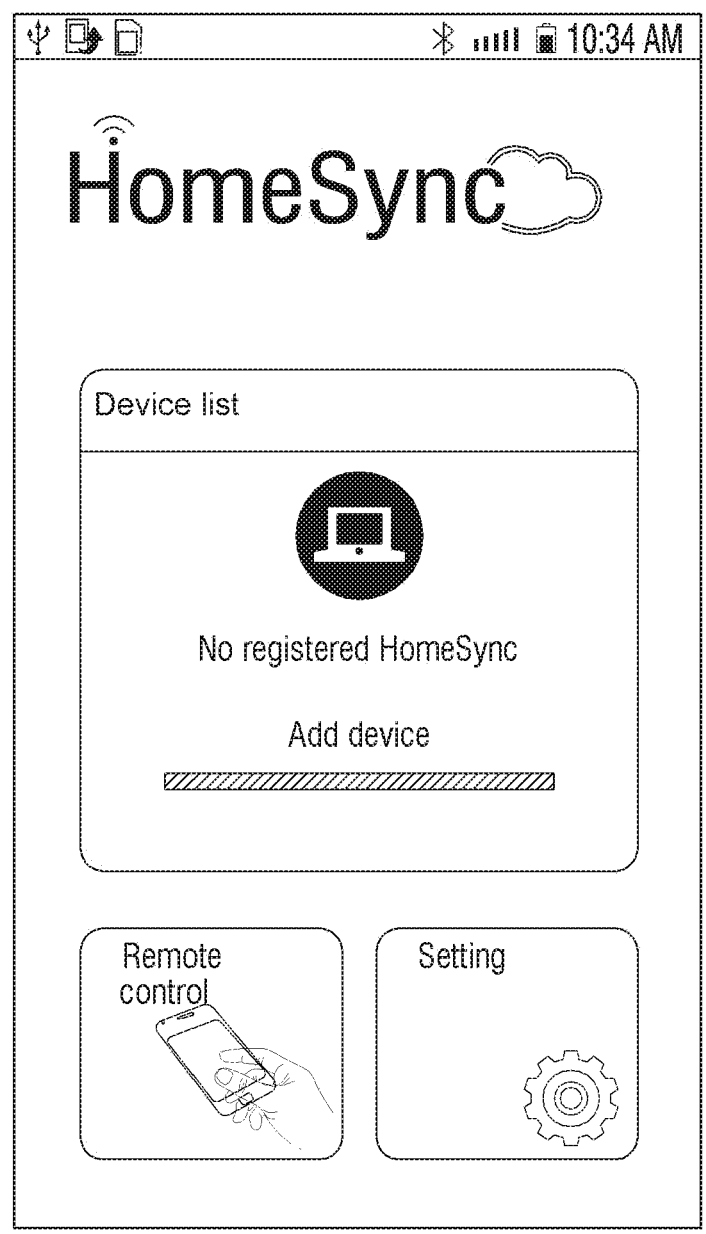
FIGS. 13A, 13B, 13C, 13D, 13E, and 13F are views illustrating a UI that is provided when registering a personal cloud apparatus in a registration server through an electronic device if a preset application is installed according to an embodiment of the present disclosure.

Referring to FIG. 12 and FIGS. 13A-13F, in operation S1210, the electronic device 100 determines whether a preset application is executed. The preset application may be an application that allows the electronic device 100 to share content by using the personal cloud apparatus 200. If the preset application is executed, the electronic device 100 may display a notification UI as shown in FIG. 13A.

Figure 13B:
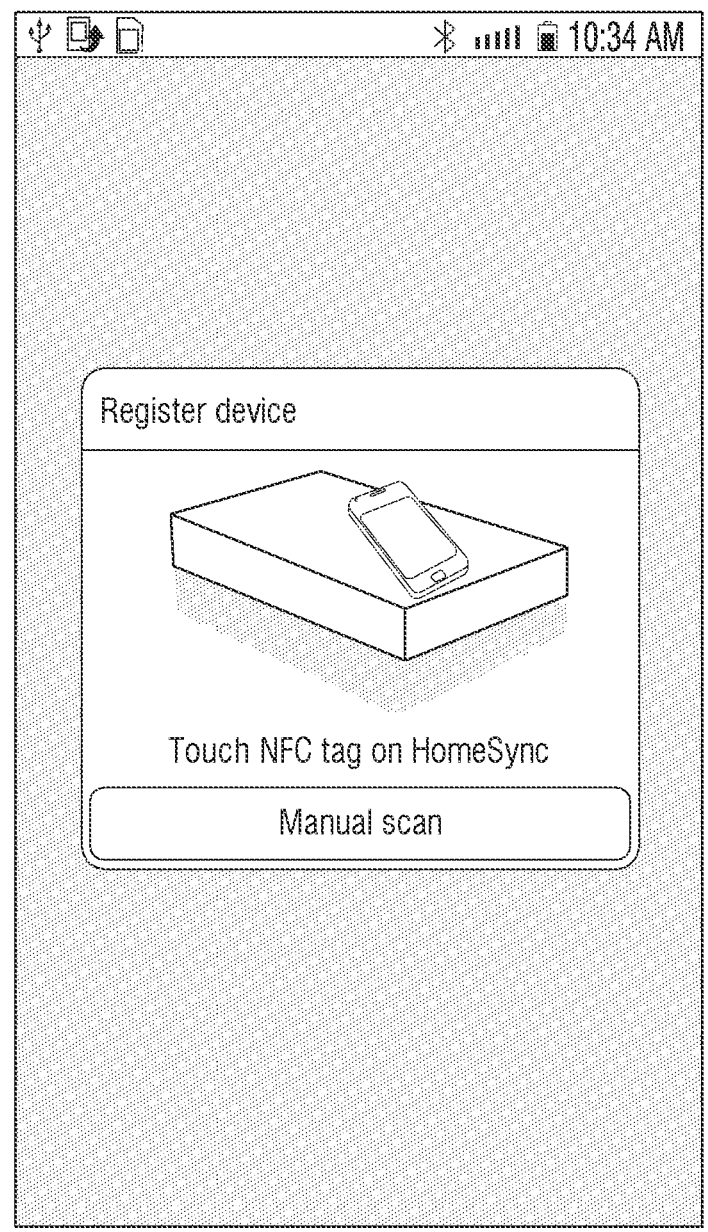

If it is determined in operation S1210 that the preset application is executed, the electronic device 100 displays a UI that notifies an NFC in operation S1220. The electronic device 100 may display a UI that notifies an NFC tagging operation of the electronic device 100 as shown in FIG. 13B. As shown in FIG. 13B, the UI may include a manual connection icon that notifies a manual connection.

In operation S1230, the electronic device 100 determines whether NFC tagging is performed. If the electronic device 100 is positioned within a preset distance (for example, 10 cm) from the personal cloud apparatus 200, the electronic device 100 may determine that the NFC tagging is performed If it is determined in operation S1230 that the NFC tagging is performed, the electronic device 100 receives pairing information from the personal cloud apparatus 200 by using the NFC in operation S1240. The pairing information may be MAC address information of the personal cloud apparatus 200.

In operation S1250, the electronic device performs a pairing operation by using the pairing information. The electronic device 100 may perform a Bluetooth pairing operation by using the MAC address information of the personal cloud apparatus 200 received through the NFC without an additional user input.

If it is determined in operation S1230 that the NFC tagging is not performed, the electronic device 100 receives a command to select the manual connection icon in operation S1260 and performs a manual connection operation in operation S1265. If the manual connection icon is selected, the electronic device 100 may perform a discovery operation for searching for at least one personal cloud apparatus existing within a preset distance from the electronic device 100.

Figure 13C:
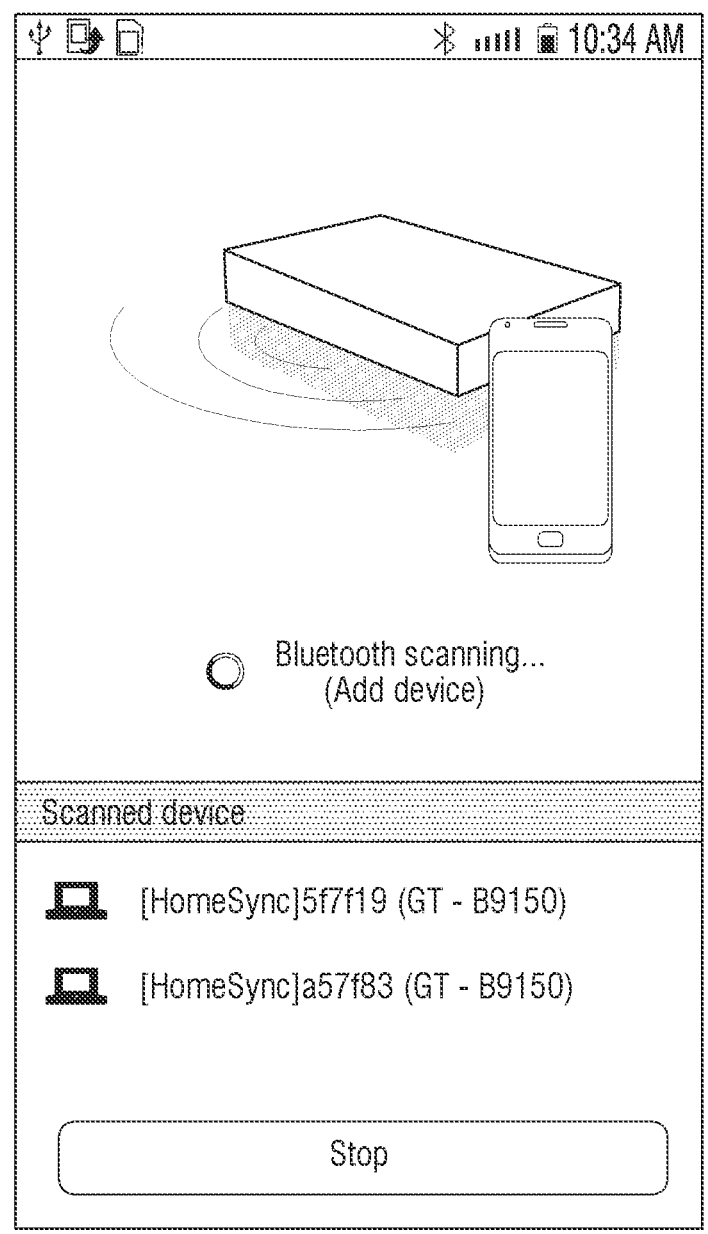

The electronic device 100 may also receive the MAC address information from the searched at least one personal cloud apparatus. If the MAC address information is received from the at least one personal cloud apparatus, the electronic device 100 may display a search list including the searched personal cloud apparatus as shown in FIG. 13C.

Figure 13D:
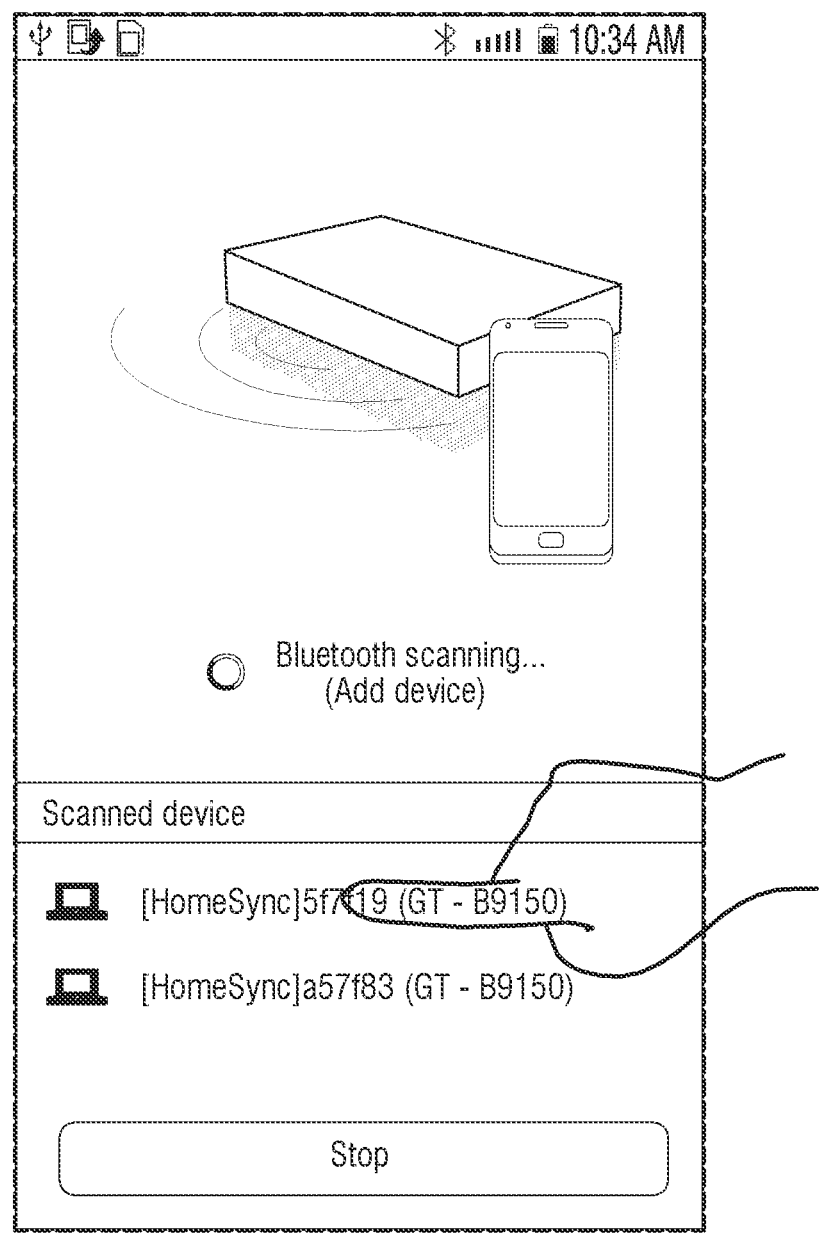

If one of searched at least one personal cloud apparatuses included in a search list as shown in FIG. 13D is selected, the electronic device 100 may set a channel through which the electronic device 100 will communicate with the selected personal cloud apparatus. If one of the at least one personal cloud apparatuses displayed in the search list is selected, the electronic device 100 may display a password input UI for inputting a password of the selected personal cloud apparatus as shown in FIG. 13F. If the password of the personal cloud apparatus is input through the password input UI, the electronic device 100 may set a channel through which the electronic device 100 will communicate with the selected personal cloud apparatus.

Figure 13E:
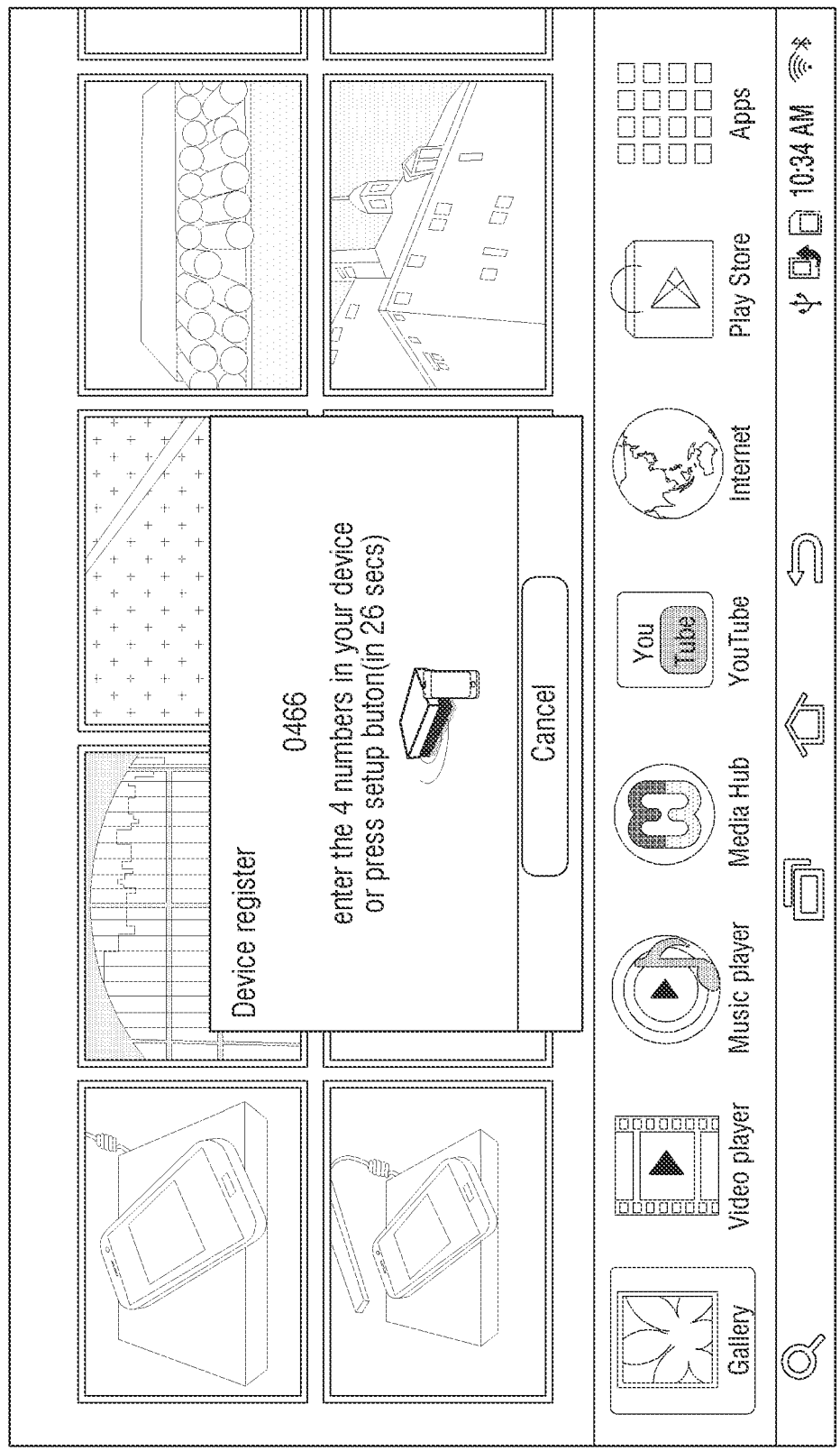
Figure 13F:
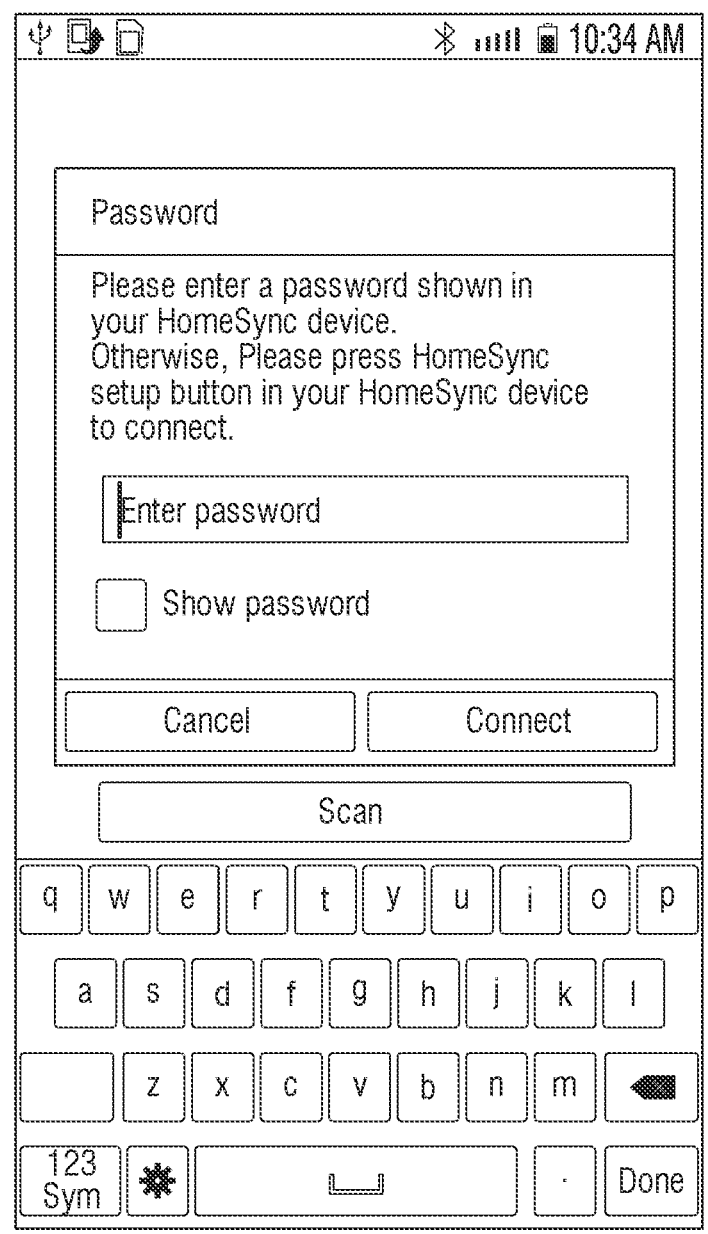

A password that will be input into the password input UI may be displayed on an external display apparatus that is connected to the selected personal cloud apparatus as shown in FIG. 13E. If a channel is set, the electronic device 100 may transmit a request signal for requesting a connection to the selected personal cloud apparatus to the selected personal cloud apparatus through the set channel and receive a response signal for responding the request signal to completely perform the pairing operation After pairing is automatically performed with the personal cloud apparatus 200 by using NFC tagging as described in operations S1230 through 1250 or pairing is manually performed with the personal cloud apparatus 200 as described in operation S1260 and S1265, the electronic device 100 acquires AP information and transmits the AP information to the personal cloud apparatus 200 in operation S1270. The electronic device 100 determines that the personal cloud apparatus 200 is connected to a network in operation S1280 and registers the personal cloud apparatus 200 in the registration server 530 in operation S1290. Operations S1270 through 1290 of FIG. 12 are the same as those of operations S250 through 270 of FIG. 2, and thus their repeated descriptions are omitted.

As described above, if a preset application is preset, an electronic device having an NFC function may easily register the personal cloud apparatus 200 in the registration server 530 without an additional user input. Although the electronic device does not have the NFC function, the electronic device may intuitively register the personal cloud apparatus 200 in the registration server 530.

Through the personal cloud system 10 as described above, a user may register the personal cloud apparatus 200 in the registration server 530 by using the electronic device 100 to download or upload content in or outside a home by using the personal cloud apparatus 200. The user may share content in a plurality of electronic devices through the personal cloud apparatus 200. A plurality of users may also share content stored in the one personal cloud apparatus 200.

According to an embodiment of the present general inventive concept, one electronic device may control another electronic device by using the personal cloud apparatus 200. The personal cloud apparatus 200 may share content with an external apparatus 1400 as shown in FIGS. 14A through 14C and the electronic device 100 by using a first communication interface (for example, a WiFi interface), and transmit and receive a control command by using a second communication interface (a Bluetooth interface) different from the first communication interface.

Figure 14B:
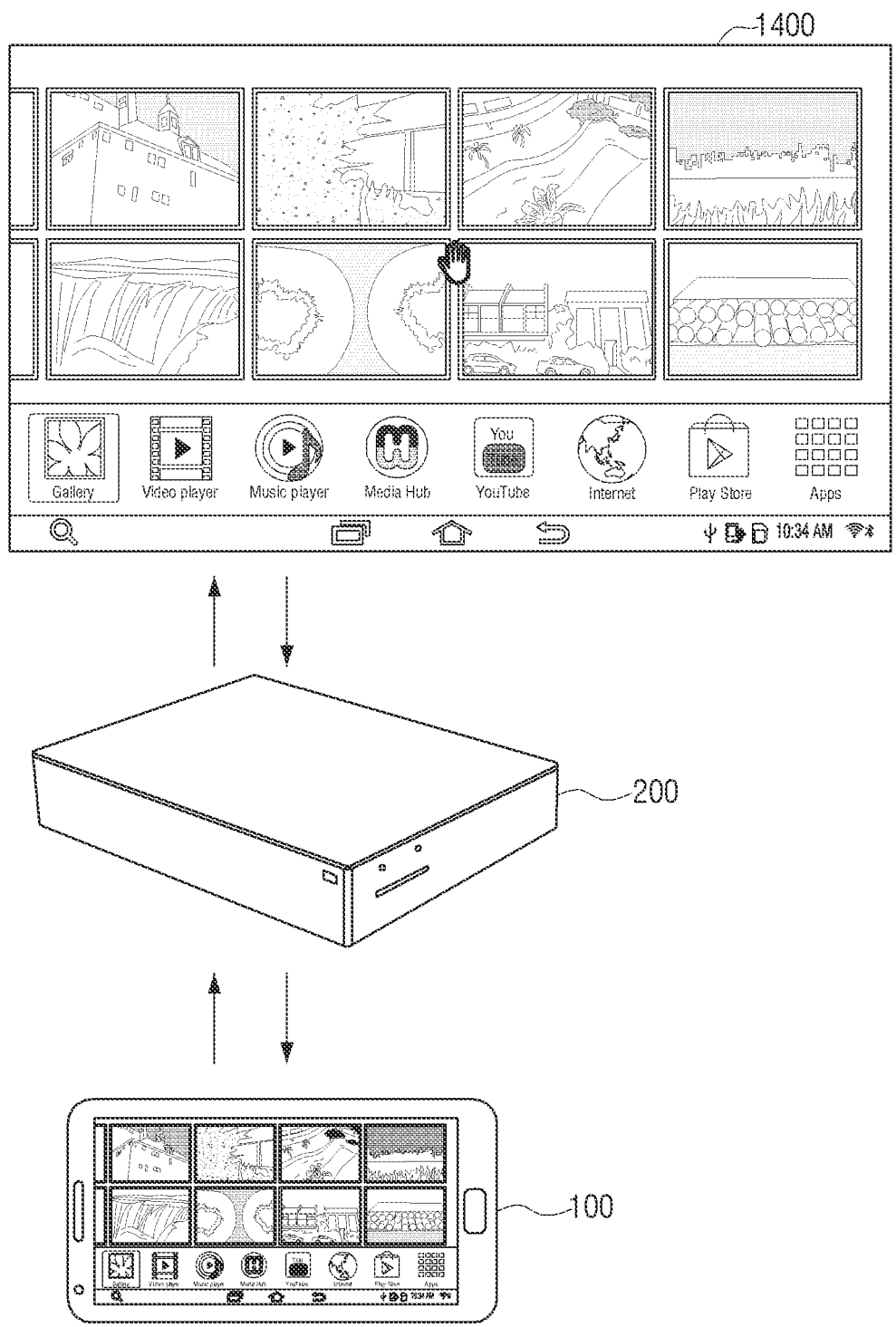

FIGS. 14A, 14B, and 14C are views illustrating a method of remotely controlling an external apparatus through an electronic device by using a personal cloud apparatus according to an embodiment of the disclosure.

Referring to FIGS. 14A-14C, the electronic device 100 may receive a control command of the user by using various methods and mediate the personal cloud apparatus 200 through the second communication interface to transmit the received control command to the display apparatus 1400. According to an embodiment of the present disclosure, the electronic device 100 senses a motion of a user as shown in FIG. 14A by using a sensor (for example, a gyro sensor) that senses the motion of the user and transmit a control command corresponding to the sensed motion to the personal cloud apparatus 200 through the second communication interface. According to another embodiment of the present disclosure, the electronic device 100 may receive and display the same content control screen as a content control screen transmitted to the display apparatus 1400 through the first communication interface as shown in FIG. 14B. If a particular icon is selected on the content control screen, the electronic device 100 may transmit a control command corresponding to the selected icon to the personal cloud apparatus 200 through the second communication interface. According to another embodiment of the present disclosure, the electronic device 100 may sense a touch input that is input on a touch screen and transmit a control command corresponding to the sensed touch input to the personal cloud apparatus 200 through the second communication interface.

The personal cloud apparatus 200 may re-transmit the control command to the display apparatus 1400, and the display apparatus 1400 may control a function thereof according to the transmitted control command.

According to various embodiments of the present disclosure, the user may control the display apparatus 1400 by using the electronic device 100 such as a smartphone with content stored in the personal cloud apparatus 200.

According to various embodiments of the present disclosure as described above, a user may register a personal cloud apparatus in an external registration server through a minimum input.

A program code for performing a method of registering the personal cloud apparatus 200 according to the embodiments of the present disclosure may be stored on various types of recording media. The program code may be stored on various types of computer-readable recording media such as a Random Access Memory (RAM), a flash memory, a Read Only Memory (ROM), an Erasable Programmable ROM (EPROM), an Electronically Erasable and programmable ROM (EEPROM), a register, a hard disc, a removable disc, a memory card, a Universal Serial Bus (USB) memory, a CD-ROM, and the like.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of an electronic device for registering an external storage apparatus in a registration server, the method comprising:

receiving download information of an application and pairing information of the external storage apparatus from the external storage apparatus;

downloading the application based on the download information;

executing the application;

in response to the application being executed, performing a pairing operation with the external storage apparatus based on the pairing information;

acquiring information of an access point (AP) from the AP;

transmitting the information of the AP to the external storage apparatus;

determining whether the external storage apparatus is connected to a network based on determining that the external storage apparatus is connected to the AP using the information of the AP;

in response to determining that the external storage apparatus is connected to the network, transmitting a user account information of the external storage apparatus and the pairing information to the registration server; and in response to the external storage apparatus being registered in the registration server based on the user account information and the pairing information, transmitting content stored in the external storage apparatus to another electronic device which is connected to the network, wherein the content comprises at least one of video content and audio content, wherein the information of the AP is encoded using a session key from the external storage apparatus, and wherein the external storage apparatus is configured to decode the information of the AP based on the session key and to access the AP.

2. The method of claim 1, further comprising determining whether the electronic device is configured to transmit the information of the AP based on a signal that is received from the external storage apparatus and generated by a specific button of the external storage apparatus.

3. The method of claim 2, further comprising, when the electronic device is configured to transmit the information of the AP based on the signal, receiving a generated random value as the session key from the external storage apparatus.

4. The method of claim 2, further comprising, when the electronic device is not configured to transmit the information of the AP based on the signal, displaying a password input user interface (UI) for inputting a password of the AP, wherein the information of the AP to the external storage apparatus is transmitted in response to the password of the AP being input into the password input UI.

5. The method of claim 1, wherein the download information of the application comprises a name, a version, and download uniform resource locator (URL) information, and wherein the pairing information of the external storage apparatus comprises media access control (MAC) address information of the external storage apparatus.

6. The method of claim 5, further comprising:

in response to a user account being logged in to a certification server, receiving the user account information from the certification server;

in response to the external storage apparatus being registered in the registration server based on the user account information and the MAC address information, receiving domain information and peer identification (ID) information of a network server that the external storage apparatus accesses, from the registration server; and transmitting the domain information and the peer ID information to the external storage apparatus, wherein the transmitting of the user account information and the pairing information comprises transmitting the user account information and the MAC address information of the external storage apparatus to the registration server.

7. The method of claim 6, wherein the external storage apparatus is connected to the network through the network server by using the domain information and the peer ID information.

8. The method of claim 1, wherein the user account information comprises a peer identifier that is generated based on a media access control (MAC) address of the external storage apparatus.

9. The method of claim 8, wherein the registration server is configured to transmit the peer identifier to a network server for mediating communication between the electronic device and the external storage apparatus.

10. A non-transitory computer readable storage medium storing instructions thereon that, when executed, configure at least one processor to perform the method of claim 1.

11. An electronic device comprising:

a transceiver configured to communicate with an external storage apparatus and an external server;

a display; and at least one processor configured to:

receive download information of an application and pairing information of the external storage apparatus from the external storage apparatus, download the application based on the download information of the application received through the transceiver, execute the application, in response to the application being executed, perform a pairing operation with the external storage apparatus based on the pairing information, control the transceiver to acquire information of an access point (AP) from the AP, transmit the information of the AP to the external storage apparatus, determine whether the external storage apparatus is connected to a network based on determining that the external storage apparatus is connected to the AP using the information of the AP, in response to determining that the external storage apparatus is connected to the network, transmitting a user account information of the external storage apparatus and the pairing information to a registration server, and in response to the external storage apparatus being registered in the registration server based on the user account information and the pairing information, transmit content stored in the external storage apparatus to another electronic device which is connected to the network, wherein the content comprises at least one of video content and audio content, wherein the information of the AP is encoded using a session key from the external storage apparatus, and wherein the external storage apparatus is configured to decode the information of the AP based on the session key and to access the AP.

12. The electronic device of claim 11, wherein the at least one processor is further configured to, determine whether the electronic device is configured to transmit the information of the AP based on a signal that is received from the external storage apparatus and generated by a specific button of the external storage apparatus.

13. The electronic device of claim 12,
wherein the at least one processor is further configured to, when the electronic device is configured to transmit the information of the AP based on the signal, receive a generated random value as the session key from the external storage apparatus.

14. The electronic device of claim 12,
wherein the at least one processor is further configured to, when the electronic device is not configured to transmit the information of the AP based on the signal, control the display to display a password input user interface (UI) for inputting a password of the AP, and
wherein the information of the AP to the external storage apparatus is transmitted in response to the password of the AP being input into the password input UI.

15. The electronic device of claim 11,
wherein the download information of the application comprises a name, a version, and download uniform resource locator (URL) information of the application, and
wherein the pairing information of the external storage apparatus comprises media access control (MAC) address information of the external storage apparatus.

16. The electronic device of claim 15, wherein the at least one processor is further configured to:
receive the user account information from a certification server in response to a user account being logged in to the certification server,
transmit the user account information and the MAC address information of the external storage apparatus,
in response to the external storage apparatus being registered in the registration server based on the user account information and the MAC address information, receive domain information and peer identification (ID) information of a network server accessed by the external storage apparatus from the registration server, and
transmit the domain information and the peer ID information to the external storage apparatus.

17. The electronic device of claim 16, wherein the external storage apparatus is connected to the network through the network server based on the domain information and the peer ID information.

18. A method of an electronic device for registering an external storage apparatus in a registration server, the method comprising:
in response to an application being executed, displaying a guidance user interface (UI) guiding to acquire pairing information of the external storage apparatus;
receiving the pairing information from the external storage apparatus;
performing a pairing operation with the external storage apparatus based on the pairing information;
acquiring information of an access point (AP) from the AP;
transmitting the information of the AP to the external storage apparatus, the information of the AP being used to connect the external storage apparatus to a network;
when the external storage apparatus is connected to the network using the information of the AP, transmitting a user account information of the external storage apparatus and the pairing information to the registration server; and
in response to the external storage apparatus being registered in the registration server based on the user account information and the pairing information, transmitting content stored in the external storage apparatus to another electronic device which is connected to the network,
wherein the content comprises at least one of video content and audio content,
wherein the information of the AP is encoded using a session key from the external storage apparatus, and
wherein the external storage apparatus is configured to decode the information of the AP based on the session key and to access the AP.

19. The method of claim 18,
wherein the guidance UI comprises a manual connection icon guiding a manual connection to the external storage apparatus, and
wherein the receiving of the pairing information of the external storage apparatus comprises:
in response to the manual connection icon being selected, performing a discovery operation for searching for at least one external storage apparatus within a preset distance from the electronic device;
receiving media access control (MAC) address information from the at least one external storage apparatus;
in response to one of the at least one external storage apparatus being selected, setting a channel through which the electronic device communicates with the selected external storage apparatus;
transmitting a request signal for requesting a connection to the selected external storage apparatus through the channel; and
receiving a response signal for responding to the request signal.

20. The method of claim 19, wherein the setting of the channel comprises:
displaying a search list for selecting the at least one external storage apparatus;
in response to one of the at least one external storage apparatus displayed on the search list being selected, displaying a password input UI for inputting a password of the selected external storage apparatus; and
in response to the password of the external storage apparatus being input into the password input UI, setting the channel through which the electronic device communicates with the selected external storage apparatus.

21. The method of claim 20, wherein in response to the password input UI being displayed, a password of the selected external storage apparatus is displayed on a display apparatus that is connected to the selected external storage apparatus.

22. The method of claim 19, wherein when one of the at least one external storage apparatus is selected, and then a signal generated by selecting a specific button of the selected external storage apparatus is received from the selected external storage apparatus, the channel through which the electronic device communicates with the selected external storage apparatus is set.

23. An electronic device comprising:
a transceiver configured to communicate with an external storage apparatus and an external server;
a display; and at least one processor configured to:
  in response to an application for the electronic device to share content using the external storage apparatus being executed, control the display to display a guidance user interface (UI) guiding to acquire pairing information of the external storage apparatus,
  receive the pairing information from the external storage apparatus through the transceiver,
  perform a pairing operation with the external storage apparatus based on the pairing information,
  control the transceiver to acquire information of an access point (AP) from the AP and transmit the information of the AP to the external storage apparatus,
  when the external storage apparatus is connected to a network using the information of the AP, control the transceiver to transmit a user account information of the external storage apparatus and the pairing information to a registration server, and
  in response to the external storage apparatus being registered in the registration server based on the user account information and the pairing information, transmit content stored in the external storage apparatus with another electronic device which is connected to the network,
wherein the content comprises at least one of video content and audio content,
wherein the information of the AP is encoded using a session key from the external storage apparatus, and
wherein the external storage apparatus is configured to decode the information of the AP based on the session key and to access the AP.

24. The electronic device of claim 23,
wherein the guidance UI comprises a manual connection icon guiding a manual connection to the external storage apparatus, and
wherein the at least one processor is further configured to:
  in response to the manual connection icon of the guidance UI being selected:
    perform a discovery operation for searching for at least one external storage apparatus within a preset distance from the electronic device, and
    receive media access control (MAC) address information from the at least one external storage apparatus, and
  in response to one of the at least one external storage apparatus being selected:
    set a channel through which the electronic device communicates with the selected external storage apparatus,
    transmit a request signal requesting a connection to the selected external storage apparatus through the channel, and
    control the transceiver to receive a response signal for responding to the request signal.

25. The electronic device of claim 24, wherein the at least one processor is further configured to:
  display a search list for selecting the at least one external storage apparatus,
  in response to one of the at least one external storage apparatus displayed on the search list being selected, display a password input UI for inputting a password of the selected external storage apparatus, and
  control the transceiver to set the channel through which the electronic device communicates with the selected external storage apparatus.

26. The electronic device of claim 25, wherein in response to the password input UI being displayed, a password of the selected external storage apparatus is displayed on a display apparatus connected to the selected external storage apparatus.

27. The electronic device of claim 24, wherein the at least one processor is further configured to, when one of the at least one external storage apparatus is selected, and a signal generated by selecting a specific button of the selected external storage apparatus is received from the selected external storage apparatus through the transceiver, control the transceiver to set the channel for communication between the electronic device and the selected external storage apparatus.

* * * * *